(12) United States Patent
Di Mascio et al.

(10) Patent No.: US 12,032,652 B1
(45) Date of Patent: Jul. 9, 2024

(54) ATTRIBUTION ANALYSIS

(71) Applicant: Inalytics Ltd, Croydon (GB)

(72) Inventors: Riccardo Di Mascio, Croydon (GB); David Goodman, Croydon (GB); Katharine Land, Croydon (GB); Alessandro Lunghi, Croydon (GB)

(73) Assignee: INALYTICS LTD, Croydon (GB)

( * ) Notice: Subject to any disclaimer, the term of this patent is extended or adjusted under 35 U.S.C. 154(b) by 0 days.

(21) Appl. No.: 18/498,892

(22) Filed: Oct. 31, 2023

Related U.S. Application Data

(63) Continuation of application No. PCT/GB2023/050880, filed on Apr. 3, 2023.

(51) Int. Cl.
*G06F 17/11* (2006.01)

(52) U.S. Cl.
CPC .................................. *G06F 17/11* (2013.01)

(58) Field of Classification Search
CPC ...................................................... G06F 17/11
See application file for complete search history.

(56) References Cited

U.S. PATENT DOCUMENTS

| | | |
|---|---|---|
| 7,668,773 B1 | 2/2010 | Pruitt |
| 9,245,299 B2 | 1/2016 | Riggs |
| 2016/0098796 A1 | 4/2016 | Jeet et al. |

FOREIGN PATENT DOCUMENTS

| | | |
|---|---|---|
| CN | 114119250 A | 3/2022 |

OTHER PUBLICATIONS

International Search Report and Written Opinion for corresponding Application No. PCT/GB2023/050880, dated Jun. 28, 2023, 12 pages.

*Primary Examiner* — Michael D. Yaary
(74) *Attorney, Agent, or Firm* — Dority & Manning, P.A.

(57) ABSTRACT

Example embodiments relate to a computer-implemented method for attributing different system outcomes to one or more of binary input characteristic(s), sizing input characteristic(s), and/or sub-characteristics thereof. For example, a system output may be based on a plurality of interrelated input characteristics. Systems and methods of the present disclosure can provide for disambiguation and tracing of causal chains from input to output, as well as other performance analyses. In some embodiments, performance of a first set of inputs can be compared relative to performance of a reference set of inputs based at least in part on generating a research set of inputs. The research set can include simulated inputs weighted to a neutral position with respect to the reference set.

19 Claims, 7 Drawing Sheets

ATTRIBUTION ANALYSIS

CROSS-REFERENCE TO RELATED APPLICATIONS

This application is a bypass continuation of International Application No. PCT/GB2023/050880, filed Apr. 3, 2023, the disclosure of which is hereby incorporated by reference herein in its entirety for all purposes.

FIELD

The present invention relates to a computer-implemented method for attributing different system outcomes to one or more inputs.

BACKGROUND

Outputs of complex systems can be determined by a number of characteristics.

For large systems having many subcomponents, each extending over long periods of time and being influenced by different factors, existing models may be computationally intensive when run on standard computing systems.

It is an object of techniques described in this disclosure to obviate or mitigate one or more of the problems set out herein.

SUMMARY

In an example described herein there is a computer-implemented method for attributing different system outcomes to one or more inputs. In some examples, the inputs can include binary input characteristic(s), sizing input characteristic(s), and/or sub-characteristics thereof. For example, a system output may be based on a plurality of interrelated input characteristics. Systems and methods of the present disclosure can provide for disambiguation and tracing of causal chains from input to output, as well as other performance analyses. In some embodiments, performance of a first set of inputs can be compared relative to performance of a reference (i.e. benchmark) set of inputs based at least in part on generating a simulated set of inputs. The simulated set can include simulated inputs weighted to a neutral position with respect to the benchmark set.

In some examples, for instance, a system can be a growth or decay based system. For instance, in some examples, a system can include growth or decay rates for one or more resources in the system. In this manner, for example, performance outcomes of the system can be based on many interrelated factors. For instance, performance outcomes (e.g., high growth, etc.) can be based on selection of resources having a desired growth rate (e.g., a binary selection characteristic), as well as based on selection of a quantity of such a resources (e.g., a sizing characteristic). In some examples, a time period for executing and implementing the selection(s) (e.g., in stages) can provide for one or more sub-characteristics thereof.

In one example embodiment, aspects of the present disclosure can be used in determining the impacts or performance of one or more inputs of a set of inputs into a complex system. For example, techniques described herein may be used to isolate the impact of decisions that lead to a first set of states relative to a reference set of states. In some embodiments, the method may comprise receiving, at a first computing device, a first input comprising one or more first states of the first set of states across a first period of time, receiving, at the first computing device, a second input comprising second states of the reference set of states across the first period of time, generating, by the first computing device, a simulated set of states comprising one or more simulated states, the generating comprising calculating, at the first computing device, and using the first input and the second input, one or more weights each corresponding to a respective state in the simulated set of states, such that the states in the simulated set of states are weighted according to a neutral position with respect to the reference set of states; and outputting the simulated set of states.

In one example embodiment, the states may be energy saving measures and the state decisions may relate to decisions to improve the energy efficiency of a building. For example, the first set of states may be a first building comprising first set of energy saving measures, the reference set of states may be a reference building comprising a second set of energy saving measures and the simulated set of states may be a simulated building comprising one or more simulated energy saving measures. As an example, the energy saving measures may be water-saving measures (e.g. a water-saving shower head, cistern, faucet flow-regulator, etc), solar panels or building insulation.

In alternative example embodiment, each state may be an investment and the state decisions may relate to decisions to invest in investments and each state may correspond to an investment. For example, the first set of states may be a first portfolio comprising first investments, the reference set of states may be a benchmark portfolio comprising second investments and the simulated set of states may be a simulated portfolio comprising one or more simulated investments. In the context of investments, the simulated set of states may be referred to as a research portfolio.

As described in more detail below, the techniques described herein are particularly suited to matrix calculations, thereby allowing the method to be tailored to efficient computer hardware arrangements for parallel processing, such as the use of graphical processing unit (GPUs). That is, while other ways to analyse performance of state decisions may be possible, the techniques and operations described herein have been developed so as to enable detailed and accurate analysis of state decisions in a way that can make best use of available computer architectures. The highly parallelizable processing techniques described herein, therefore improve the ability of computers to attribute different outcomes of a complex system to particular inputs to that complex system.

Each state may have a size corresponding to a value related to the state. As an example, in the example embodiment relating to energy saving measures, energy saving measures may each have a value i.e. a first set of solar panels may have a first value and a second set of solar panels may have a second value. In the example embodiment relating to decisions to invest, the size of each investment may correspond to the value of each investment.

Each state may have a weight (or weighting) corresponding to the size of the state divided by the total size of all states in a set of states.

A neutral position is a weight agnostic position. That is, a neutral set of states is one in which a size of any individual state in the first set of states does not directly determine the size of the corresponding state in the simulated set of states. Beneficially, the simulated set of states may allow analysis of the first set of states with respect to the reference set of states and characteristics of decisions that determined the first set of states.

It will be appreciated that a period of time associated with the first input period may comprise the first period of time (i.e. may be the first period of time or may be longer than the first period of time) and a period of time associated with the second input may also comprise the first period of time.

The simulated set of states may comprise the same states as the states comprised in the first set of states.

Outputting the first set of states may comprise storing the simulated set of states in a memory of or accessible to the first computing device, or transmitting the simulated set of states from the first computing device to another computing device.

Calculating one or more weights for a simulated set of states corresponding to a neutral position may comprise: identifying a set of selected states from the first set of states; calculating a first factor, wherein the first factor is calculated as:

$$f_1 = \frac{1 - \sum_{i=1}^{n_s} w_i^b}{n_s}$$

where $n_s$ is a number of states in the set of selected states and $w_i^b$ is a corresponding weight in the reference set of states of each state in the set of selected state; calculating a second factor, $f_2$, wherein the second factor is calculated as:

$$f_2 = 1 - \sum_{i=1}^{n_{ns}} w_i^p$$

where $n_{ns}$ is a number of states in the first set of states that are not in the set of selected states and $w_i^p$ is a weight of each state in the first set of states that is not in the set of selected states; determining, for each selected state, a corresponding weight of the state in the simulated set of states, $w_i^{r,s}$, as:

$$w_j^{r,s} = (f_1 + w_j^b) \times f_2$$

where $w_j^b$ is a corresponding weight of the state in the reference set of states; determining, for each state in the first set of states not in the set of selected states, a corresponding weight of the state in the simulated set of states, $w_k^{r,ns}$, as:

$$w_k^{r,ns} = w_k^p$$

where $w_k^p$ is a weight of the state in the first set of states; and determining, for each state not in the first set of states, a corresponding weight of the state in the simulated set of states, $w_i^{r,nh}$, as:

$$w_i^{r,nh} = 0.$$

In the example embodiment relating to energy saving measures, a state may relate to an installed energy saving measures. In the example embodiment relating to investments, a state may relate to a held investment.

Identifying a set of selected states may comprise identifying a state as selected if a weight of the state in the first set of states is greater than a corresponding weight of the state in the reference set of states at any point during the first period of time.

Alternatively or additionally, a state may be selected if the state is in the first set of states for longer than a minimum period, if the state is in the first set of states with a minimum weight, if the state is in the first set of states with a minimum active weight compared to the reference set of states and/or if the state relates to a particular characteristic of the state (for example, in the example embodiment relating to decisions to invest, the particular characteristic may be the sector, market and/or country of the investment).

The first time period may comprise a plurality of time intervals. Each time interval may correspond to a day, a week, month, quarter, year or otherwise.

The method may further comprise receiving, as an input, first benefits corresponding to the first states and second benefits corresponding to the second states. In the example embodiment relating to energy saving measures, the benefits may be energy savings, each energy saving corresponding to an energy saving measure. In the example embodiment relating to investment decisions, the benefits may be returns i.e. first returns corresponding to the first investments and second returns corresponding to the second investments.

The first and second benefits may each comprise a plurality of benefits, each benefit of the plurality of benefits corresponding to a time interval of the plurality of time intervals of the first period of time. For example, the first and second benefits may be daily benefits corresponding to each day of the first period of time.

The method may further comprise determining a relative benefit for each state in the first set of states and for each time interval of the first period of time, comprising: determining a total absolute benefit for the reference set of states for each time interval, comprising a sum of an absolute benefit for each state multiplied by the corresponding weight of the state in the reference set of states; and determining, for each state in the first set of states and for each time interval, a corresponding relative benefit as the difference between an absolute benefit of the state for the time interval and the total absolute benefit for the reference set of states corresponding to the time interval.

The method may further comprise determining, based on the simulated set of states, a performance metric of the first set of states attributable to one or more particular characteristics of the first set of states over the first period of time.

The particular characteristics of the first set of states may be, for example, the relative weightings of states or the decisions that lead to states being extant or not extant (i.e. the decision to install/not install energy saving measures or to invest/not invest in investments).

The method may further comprise: determining a simulated benefit matrix corresponding to a performance of each state in the simulated set of states for each time interval of the first period of time, comprising, for each state and for each time interval, multiplying a relative benefit of the state for the time interval by a corresponding weight of the state in the simulated set of states; determining a reference benefit matrix corresponding to a performance of each state in the reference set of states for each time interval of the first period of time, comprising, for each state and for each time interval, multiplying the relative benefit of the state for the time interval by a corresponding weight of the state in the reference set of states; and determining a first difference benefit matrix, the first difference benefit matrix corresponding to the difference between the simulated benefit matrix and the reference benefit matrix.

The method may further comprise: determining a first total corresponding to a sum across the first difference benefit matrix over each state over each time interval of the first period of time; and outputting the first total.

Beneficially, the first total may provide an indication of the performance of the first set of states attributed to the cumulative binary decisions that lead to states of each of the first states being extant/not extant during the first period of time.

The method may further comprise: determining a set of states benefit matrix corresponding to a performance of each state in the first set of states for each time interval of the first period of time, comprising, for each state and for each time interval, multiplying a relative benefit of the state for the time interval by a corresponding weight of the state in the first set of states; determining a simulated benefit matrix corresponding to a performance of each state in the simulated set of states for each time interval of the first period of time, comprising, for each state and for each time interval, multiplying the relative benefit of the state for the time interval by a corresponding weight of the state in the simulated set of states; and determining a second difference benefit matrix, the second difference benefit matrix corresponding to the difference between the set of states benefit matrix and the simulated benefit matrix.

The method may further comprise: determining a second total corresponding to a sum of the second difference benefit matrix over each state and over each time interval of the first period of time; and outputting the second total.

Advantageously, the second total may provide an indication of the performance of the first set of states attributed to the sizing (i.e. the size of each state in the first set of states). The sizing may correspond to the value of the energy saving measures or the value of investments.

The method may further comprise: determining a third total corresponding to a sum of the first difference benefit matrix over each state in the simulated set of states that is identified as selected and over each time interval of the first period of time; and outputting the third total.

Beneficially, the third total may provide an indication of the performance of the first set of states attributed to the decisions that lead to states being extant (i.e. decisions to install energy saving measures or decisions to invest in the investment) in both the first set of states and the reference set of states.

The method may further comprise: determining a fourth total corresponding to a sum of the first difference benefit matrix over each state in the simulated set of states that is not identified as selected and over each time interval of the first period of time; and outputting the fourth total.

Beneficially, the fourth total may provide an indication of the performance of the first set of states attributed to the decision that leads to states not being in the first set of states and in the reference set of states.

The method may further comprise, receiving, as input, a build time for defining a plurality of build intervals, and defining the plurality of build intervals may further comprise: for each state extant during the first time interval of the first period of time, determining the corresponding build interval as the first time interval of the first period of time; and for each state not extant during the first time interval of the first period of time, determining the corresponding build interval as a time interval equivalent to the time interval a state was first extant plus the build time.

For example, the build time may be ten days and the build interval (for a state) may be for example, the tenth day after the state was first extant.

The method may further comprise: determining an initial sizing weight matrix, comprising: determining, for each state and for each time interval prior to a corresponding build interval, a weight as a corresponding weight in the first set of states for a corresponding time interval and corresponding state minus a corresponding weight in the simulated set of states for a corresponding time interval and corresponding state; determining, for each state and for each time interval equal to, or after, the corresponding build interval, the weight of the state as the weight as a corresponding weight in the first set of states for a corresponding state extant during the build interval minus the corresponding weight in the simulated set of states for a corresponding state extant during the build interval; and determining an initial sizing benefit matrix corresponding to a performance of each state in the initial sizing weight matrix for each time interval of the first period of time, comprising, for each state and each time interval, multiplying a relative benefit of the state for the time interval by the corresponding weight of the state in the initial sizing weight matrix.

The method may further comprise: determining a fifth total corresponding to a sum of the initial sizing benefit matrix over each state and over each time interval of the first period of time; and outputting the fifth total.

Beneficially, the fifth total may provide an indication of the performance of the first set of states attributed to the initial sizing decision (i.e. the sizing at the build interval).

The method may further comprise: determining a change in sizing benefit matrix corresponding to a performance of each state in the first set of states due to a change in the corresponding sizing after the corresponding build interval, comprising: for each state and for each time interval, determining a corresponding benefit as the difference between a corresponding benefit in the second difference benefit matrix and a corresponding benefit in the initial sizing benefit matrix.

The method may further comprise: determining a sixth total corresponding to a sum of the change in sizing benefit matrix over each state and over each time interval of the first period of time; and outputting the sixth total.

Beneficially, the sixth total may provide an indication of the performance of the first set of states attributed to the changes since initial sizing decision (i.e. changes in the sizing since the build interval) of states in the first set of states.

As discussed above, the methods disclosed herein may be applied to analyse the contributions of actions/decisions taken to optimise the energy efficiency of a building. In other words, a first building with a first set of energy saving measures may be analysed and compared to a reference building comprising a second set of energy saving measures. The difference in the benefit (i.e. energy saving) may be compared between the first building and the reference building and the difference may be attributed to characteristics of the decisions that determined the first set of energy saving measures. It will be appreciated that the actions may be concrete actions taken in the physical world, or may be simulated actions applied to a model.

Likewise, the methods disclosed herein may be applied to vehicle design, for example when considering which components may be included in a vehicle. For example, when designing spacecraft (or a launch vehicle for a spacecraft), a first spacecraft with a first set of components may be analysed and compared to a reference spacecraft comprising a second set of components. In such an example, the 'size' of each component may be the cost or the mass of each component and the benefit may be the thrust provided by the component. The difference in thrust may be compared between the first spacecraft and the reference spacecraft and the difference may be attributed to characteristics of the decisions that determined the first set of components.

As also discussed above, the methods disclosed herein may be applied to investment decisions. While the example embodiment relating to investment decisions is discussed in more detail below, it should be understood that this is merely exemplary and the skilled person would understand the methods may be applied more widely than the examples discussed herein.

As described in the detailed description below, any one or more of various inputs, outputs and results of intermediate calculations (e.g. the first set of states benefit matrix) of the method set out above may be formulated as matrices and various ones of the processes performed on the inputs and outputs may be performed by one or more accelerator cores of a computing device, such as GPUs, tensor cores, etc to adapt the method to exploit computer hardware and parallelization and enable computers to more efficiently carry out the modelling described herein.

In a further example described herein, there is a computer configured to perform the method of the previous example.

In a further example described herein, there is a non-transitory computer-readable memory which, when executed, causes one or more computers to perform the method of the previous example.

BRIEF DESCRIPTION OF THE DRAWINGS

Embodiments of the invention will now be described, by way of example only, with reference to the accompanying schematic drawings, in which.

DETAILED DESCRIPTION

Figure 1:
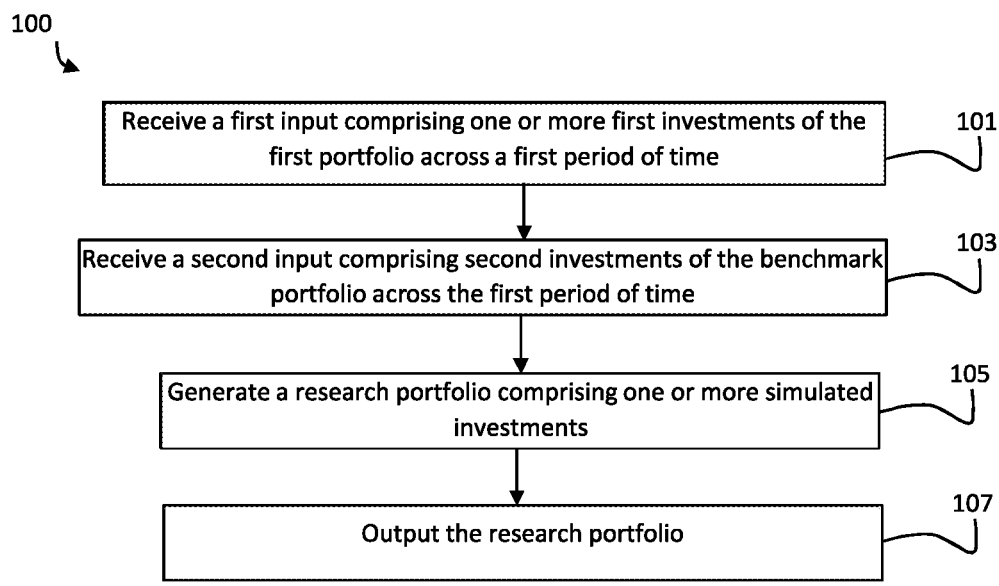
FIG. 1 depicts an example of a computer-implemented method for use in analysing a performance of one or more investment decisions of a first portfolio relative to a benchmark portfolio.

As described above, the techniques described herein may be used to isolate and analyse the performance of individual inputs of a set of inputs into a complex system. For the purpose of ease of description, an example is provided below that relates to analysing the performance of investment decisions. As such, while the figures and the description below focus on one particular example embodiment of the present techniques, it will be understood, however, that the techniques described herein are not so limited and may be applied broadly.

A portfolio is a collection of one or more investments. Each investment may be, for example, a stock, a bond, a future, an option, a fund (itself comprising one or more investments) or otherwise. A size (i.e. a corresponding financial value) of each investment held in the portfolio may be different.

Each investment held in the portfolio may have a corresponding weight, the weight being a percentage of the total size of the portfolio held in the investment. As an example, for a portfolio consisting of a £50 investment in investment A and a £150 investment in investment B, investment A has a 25% weight and investment B has a 75% weight. An investment not held in a portfolio may have a corresponding weight (or size) of 0.

A portfolio may be managed by a portfolio manager, i.e. the portfolio manager may decide whether to invest or not invest in each investment available to them and to change the size (i.e. by buying or selling) of each investment in the portfolio. By making decisions to invest in an investment or change the size of each investment already held, the investments held in a portfolio may change. In other words, the portfolio may be actively managed.

As an alternative, a portfolio may be an index fund comprising a collection of investments, for example, investments from a particular market, constructed to track the corresponding index. The investments held in an index determined by a fixed algorithm. As an example of an index determined by a fixed algorithm, the FTSE 100 index comprises the largest one-hundred companies by market capitalization listed on the London Stock Exchange, updated quarterly.

A measure of performance of a portfolio (comprising one or more investments) is 'absolute returns' i.e. a profit (or a loss) due to a change in value of the investments held in the portfolio. To allow for comparisons between different sizes of investments, absolute returns may be expressed as a fraction (or a percentage) to express the returns corresponding to the size of the corresponding investment. For example, if the absolute return for an investment across a time period is 50%, a £100 investment would return a £50 profit (across the time period).

A measure of performance of a first portfolio may be compared to a measure of performance of a second portfolio, for example, by comparing (absolute) returns provided by each of the first and second portfolio. The second portfolio may be a benchmark to which the first portfolio is compared, in which case the second portfolio may alternatively be referred to as a benchmark portfolio.

A comparative performance of the first portfolio (with respect to the benchmark portfolio) may be referred to as 'alpha' ($\alpha$) or a relative return, corresponding to a difference in absolute returns from the first portfolio and absolute returns from the benchmark portfolio. If the first portfolio has a positive alpha, the first portfolio has outperformed the benchmark portfolio (i.e. by providing returns more positive than, or in excess of, the returns from the benchmark portfolio). If the benchmark portfolio outperformed the first portfolio, the alpha would be negative. For example, if the absolute return for the first portfolio across a time period is 50% and the absolute return for the benchmark portfolio for the same time period is 45%, the corresponding alpha would be 5% and a £100 investment in the first portfolio would return £5 more than a £100 investment in the benchmark portfolio.

By calculating alpha for a first portfolio (with respect to a benchmark portfolio), one can retrospectively determine whether the first portfolio was more profitable than the benchmark portfolio. However, alpha does not capture which characteristic relating to the first portfolio resulted in the first portfolio being more profitable than the benchmark portfolio.

Herein, a characteristic corresponding to the decision to invest or not invest in an investment in a portfolio, regardless of the size of the holding, is referred to as a 'binary' characteristic. A characteristic corresponding to the size of an investment (held in the portfolio) is referred to as a 'sizing' characteristic. Each characteristic may have a corresponding decision for the portfolio manager to make. For example, for each investment held in the portfolio, the portfolio manager has previously decided to invest in the investment (making a binary decision) and has decided a corresponding size of the investment (making a sizing decision). Each characteristic may also be deconstructed into sub-characteristics that contribute to the characteristic. For example, when analysing a whole portfolio, the binary characteristic (corresponding to decisions to invest or not invest in investments in a portfolio) may be deconstructed into contributions from a 'selected-binary' sub-characteristic corresponding to binary decisions to invest in selected investments and from a 'not-selected-binary' sub-characteristic corresponding to binary decisions to invest in investments that are not selected. When first investing in an investment, portfolio managers typically buy units (e.g. portions of an investment, which may be individual shares, bonds, or units of a fund or otherwise) of the investment over a short period of time to build up to a desired position sizing (rather than buying all the units of the investment at once or, for example, in a single day). As a further example of deconstructing a characteristic into sub-characteristics, the sizing characteristic may be deconstructed into an 'initial-sizing' sub-characteristic corresponding to the sizing of an investment held after an interval of time (referred to herein as a build time) and a 'change-in-sizing' sub-characteristic corresponding to changes in the sizing of an investment held after the build time.

It is desirable to provide a method of analysing the result each characteristic (and/or each sub-characteristic) has on the alpha of a first portfolio.

For large portfolios and/or analysis of a large number of portfolios, it is further desirable for the method to be particularly suited for particular computer hardware (for example, Graphics Processing Units i.e. GPUs) to enable time-efficient analysis of the large and/or many portfolios. While originally designed for generating computer graphics, it is known that the highly parallel structure of GPUs means that GPU are efficient at carrying out other computer operations, for example, matrix operations. It is therefore desirable to develop a method of analysis that can exploit the internal workings of the structure of GPUs.

FIG. 1 depicts an example of a computer-implemented method 100 for use in analysing a performance of one or more investment decisions of a first portfolio relative to a benchmark portfolio. The method 100 has been designed such that the method 100 may be beneficially implemented on a computer comprising one or more GPUs to advantageously reduce computation times.

While the method 100 may be implemented using, for-example, for loops, the method 100 may beneficially be implemented using matrix representations and operations to particularly adapt the method to benefit from parallel processing using, e.g., GPUs. As will be clear to the skilled person, the matrix representations provided below are by way of example only and are none-limiting. For example, while the matrix representations provided below typically use columns to represent each investment of a portfolio and rows to represent each time intervals (e.g. days) of a time period, matrix representations where rows represent each investment and columns represent each time interval are equally possible.

At step 101, a first input is received at a first computing device, the first input comprising one or more first investments of the first portfolio across a first period of time. The first input may comprise, for example, the weights of each investment held in the first portfolio or data that otherwise allows the weights of each investment held in the first portfolio to be calculated. For example, the first input may comprise, for each investment held in the first portfolio a size of the investment (e.g. a quantity of units and a value of each unit, or more specifically, when the investment comprises shares, the number of shares and the value of each share).

The first time period may comprise a plurality of time intervals. For example, each time interval may be a minute, an hour, a day, a week, a month, a quarter, a year or otherwise. In an example in which the time period comprises a plurality of time intervals, the first and second inputs may comprise data corresponding to a nominal time point of each time interval. The nominal time point may be at the start, during (e.g. the middle) or at the end of each time interval. For example, if the time intervals are days, the first input may comprise the weights of the one or more first investments of the first portfolio held at the start of each day of the first period of time.

The first input may be one or more matrices. For example, a matrix representation of the first input may comprise a number of columns, where each column represents an investment of the one or more first investments, a number of rows, where each row represents, for example, each time interval of the first time period, and each element of the matrix represents the size of the holding of each investment of the one or more first investments on, for example, each time interval of the first time period.

At step 103, a second input is received, at the first computing device, comprising second investments of a benchmark portfolio across the first period of time. The second input may comprise, for example, weights of each investment held in the benchmark portfolio or data that otherwise allows the weights of each investment held in the benchmark portfolio to be calculated. For example, the second input may comprise, the size of each investment held in the benchmark portfolio. Likewise to the first input, the second input may be a matrix and may be a similar matrix representation to the matrix representation of the first input.

In the example in which the first input and/or the second input comprise data that otherwise allows the weights of each corresponding investment held in the corresponding portfolio to be calculated, the method 100 may further comprise calculating the weights of each investment held in each portfolio.

Each input (for example, the first input and the second input) may comprise an identifier for each investment. For example, if the first input comprises a first portfolio comprising investment A, the first input may also comprise an identifier corresponding to the investment A. Each identifier may be unique to an investment. Alternatively multiple different identifiers may correspond to a single investment. Each identifier may comprise a stock symbol, for example, an EPIC or TIDM code. In an example where an input (for example, the first input and the second input) comprises investments from a plurality of stock exchanges, the identifier may further comprise an identifier for a corresponding stock exchange (e.g. the market identifier code) and/or a corresponding country and the method 100 may comprise a look-up table, or otherwise, for identifying different holdings of the same investment. By including identifiers in each input, the method 100 may be able to compare the size of holding of each investment between the first portfolio and the benchmark portfolio. In terms of a corresponding matrix representation, each identifier may be stored as a first row of each matrix. Additionally or alternatively, the identifier may be implied by the position of each investment in a matrix. For example, a first column in all matrices may correspond to a first investment and in an example of the second input not comprising the first investment, all entries in the first column may be zero, empty or any other appropriate value.

If the method 100 does not receive data relating to an investment in a portfolio, the method 100 may assume the investment is not held and has a corresponding size and/or weight of zero. For example, if the first input comprises a first portfolio consisting of investments A, B and C and the second input comprises a benchmark portfolio consisting of investments A, B and D, the method may assume investment D is not held in the first portfolio and that investment C is not held in the benchmark portfolio. Assuming an investment is not held in a portfolio may comprise, for example, constructing an additional column in any corresponding matrix representation and setting each corresponding matrix element to zero, or any other appropriate value.

Prior to, or after, input, second investments of the benchmark portfolio that are not held in the first portfolio may be grouped into one or more dummy investments. The one or more dummy investments may be handled likewise to other second investments. Grouping investments into dummy investments in this way may reduce computational overheads. For example, rather than tracking returns corresponding to hundreds of second investments of the benchmark portfolio that are not held in the first portfolio, the hundreds of second investments may be grouped into a single dummy investment and the returns corresponding to the single dummy investment may be tracked. One or more identifiers may be dummy identifiers i.e. indicating that the corresponding investments are dummy investments. In terms of a matrix representation of the benchmark portfolio where each column represents a different investment, each row represents a different time interval and each value of the matrix represent the size of the corresponding holding, through use of a dummy investment, the number of columns in the matrix representation of the benchmark portfolio may be reduced to a number equal to a number of columns in a matrix representation of the first portfolio plus one (i.e. an additional column corresponding to all investments grouped into a dummy investment).

At step 105, a research portfolio is generated by the first computing device. The research portfolio comprises one or more simulated investments. The research portfolio may alternatively be referred to as a simulated portfolio. Generating the research portfolio may comprise calculating, at the first computing device, and using the first input and the second input one or more weights each corresponding to a respective investment in the research portfolio, such that the investments in the research portfolio are weighted according to a neutral position with respect to the benchmark portfolio. In other words, the research portfolio corresponds to a neutral position.

A neutral position is a weight agnostic position. That is, a neutral portfolio is one in which a size of any individual investment in the first portfolio does not directly determine the corresponding size of the corresponding investment in the research portfolio.

As discussed below, use of a neutral position beneficially allows analysis of the first portfolio with respect to the benchmark portfolio and characteristics of decisions that determined the first portfolio, i.e. portions of the alpha may be attributed to characteristics of the decisions the portfolio manager has taken.

The one or more weights may be generated 105 as described in reference to FIG. 2 below. While FIG. 2 and the corresponding description relates to a method of calculating weights for a research portfolio corresponding to a neutral position, as will be clear to the skilled person, other methods may be used such as those that may be known to the skilled person or disclosed further below (following the description corresponding to FIG. 2).

It will be appreciated that a period of time associated with the first input period may comprise the first period of time (i.e. may be the first period of time or may be longer than the first period of time) and a period of time associated with the second input may also comprise the first period of time. In other words, each of the periods of time associated with the first input and the second input may comprise a common period of time and the common period of time may be the first period of time of the method 100.

The one or more weights for the research portfolio may be calculated 105 a single time. After calculating 105 the one or more weights a single time, the one or more weight may be 'rebalanced' one or more times (i.e. calculated 105 a first time and recalculated one or more times). Recalculations may occur at regular recalculation time intervals and each recalculation time interval may be equivalent to one or more time intervals of the plurality of time intervals. In other words, if the first portfolio and benchmark portfolio comprise investments for each day of the first period of time, a recalculation may be carried out each day or carried out once after a certain number of days. For example, the one or more weights for research portfolio may be calculated 105 at the start of the first period of time (e.g. on day one) and may be re-calculated once a week, once a month or otherwise. Additionally or alternatively, a recalculation may occur in response to a change in whether an investment was held or not in either the first portfolio or the benchmark portfolio and the recalculation may occur in relation to a next time interval after the change (e.g. the day following the change). As an example, the one or more weights for a research portfolio may be calculated 105 for a research portfolio in relation to a first portfolio consisting of investments in company A and company B on day one. The one or more weights of the research portfolio may be recalculated a first time on day thirty-one (i.e. after a one month long first recalculation time interval). If investments in company C are added to the portfolio on day forty, the one or more weights of the research portfolio may be recalculated a second time on day forty-one (i.e. in response to the change in whether an investment in company C was held).

The method of the recalculation may be substantially the same as the calculation 105. The calculation 105 and/or the recalculation may use subsets of the first input (comprising the first investments held in the first portfolio) and the second input (comprising second investments of the benchmark portfolio) corresponding to a period of time to which the recalculation relates. In other words, a calculation 105 (corresponding to day one of the first period of time) may set the weights for the research portfolio on day one and a recalculation may calculate the weights for each investment held in the research portfolio on day thirty-one. In this way, the research portfolio may be 'rebalanced' to reflect changes (due to, for example, changes in the quantity of investments due to buying or selling) in the investments held in both the first portfolio and the benchmark portfolio.

Between each calculation 105 or recalculation, the weights of the research portfolio may change, for example, due to a change in the value in an investment in the research portfolio. For example, in the previous example (in which the weights for the research portfolio were calculated on day one and recalculated on day thirty-one), the weights for each investment held in the research portfolio may change on the days on which the weights were not recalculated (i.e. day two, three etc.) in response to changes in the value of investments. Such an effect may be referred to as the research portfolio 'evolving.'

At step 107, the research portfolio is provided as an output. The research portfolio, output by the method 100, (or any other output from the method 100 or methods 300, 400, 500 described below) may be stored (for example, by writing the research portfolio in computer-readable memory of or accessible to the computing system performing the method 100) or may be transmitted (i.e. from a first computer component to a second computer component, e.g. from a first computing system to a second computing system or from a first processor of a computing system to a second processor of the computing system). Additionally or alternatively, the research portfolio, output by the method 100, may be provided as an input to other methods (for example, the methods 300, 400, 500 described below). The research portfolio may be output on a display for manual analysis or may be output to a process that automatically analyses the research portfolio and suggests or automatically takes actions in response to that analysis. For example, the research portfolio may be automatically analysed, and based on that analysis, messages may be generated and/or transmitted. For example, messages may be generated to indicate that particular investments should be bought or sold (for example, instructions to buy or sell particular investments to maintain a particular active weight e.g. an equally-active weighting). One or more first systems may be configured to process the output (from the method 100) and generate messages based on the output. The messages may indicate a weight of the first portfolio has fallen below a corresponding weight (for example, an equal active weight). The messages may further indicate an amount of a first stock that should be bought and/or an amount of a second stock that should be sold. One or more second systems may be configured to receive and process the messages and to execute the instructions to perform the trades (i.e. buying the indicated amount of the first stock and selling the indicated amount of the second stock). Such messages may be processed by an investment manager, or may be configured to cause computing systems to automatically carry out investment trades, for example by causing further messages to be generated and/or transmitted, e.g. to stock exchanges, fund managers, etc.

The method 100 may further comprise receiving, as an input, first returns corresponding to the first investments and second returns corresponding to the second investments. The first and second returns may each be absolute returns. Alternatively, the method 100 may comprise receiving absolute returns corresponding to the first investments and receiving relative returns corresponding to the returns of the first investments compared to the returns of the second investments and, optionally, determining the absolute returns corresponding to the second investments. As a further alternative, the method may receive, as input, other data from which the absolute returns corresponding to each of the first and second investments may be determined and determining the absolute returns corresponding to each of the first and second investments. In the example in which the first time period comprises a plurality of time intervals, each of the first and second returns may comprise corresponding returns for each time interval of the plurality of time intervals of the first time period. For example, where the time intervals are days, each of the first and second returns may comprise corresponding returns for each investment and each day of the first time period. In the example in which one or more investments of the second portfolio are grouped to form a dummy investment, the method 100 may receive returns corresponding to the dummy investment or, alternatively, may receive returns corresponding to each investment of the dummy investment and may determine returns corresponding to the dummy investment. In the example in which the first or second input comprises identifiers, the returns may comprise identifiers. Each of the returns may be structured as a matrix where each column corresponds to an investment of the (first or benchmark) portfolio, each row corresponds to a time interval and the matrix value corresponds to the return (e.g. absolute or relative return) for the corresponding investment on the corresponding time interval.

The method may further comprise determining, based on the research portfolio, a performance metric of the first portfolio attributable to one or more particular characteristics of the first portfolio over the first period of time. As discussed below with reference to FIGS. 3 to 12, there are a number of example methods taught which the skilled person may implement or adapt to determine a performance metric. As an example of adapting the method taught herein, the skilled person may further manipulate one or more of the matrices constructed in a method to determine a corresponding characteristic for two or more bins of time.

Figure 2:
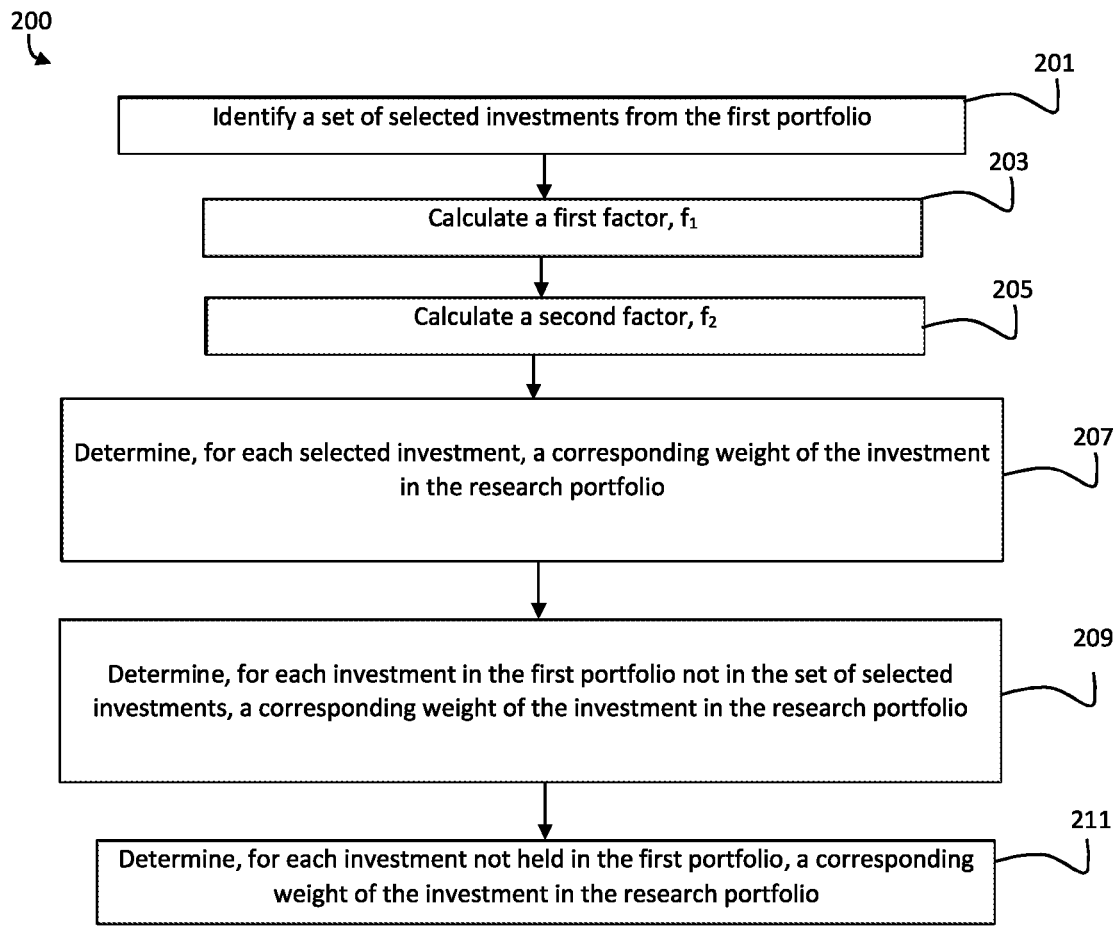
FIG. 2 depicts an example of a computer-implemented method for calculating one or more weights for a research portfolio corresponding to a neutral position.

FIG. 2 depicts an example of a computer-implemented method 200 for calculating one or more weights for a research portfolio corresponding to a neutral position. As an example, the method 100 (in particular, calculating 105 one or more weights for a research portfolio corresponding to a neutral position) may comprise the method 200.

Table 1 shows an example first portfolio (i.e. a first input comprising first investments) and benchmark portfolio (i.e. a second input comprising second investments). Weights shown in Table 1 are fractional (i.e. 0.5 corresponds to a weight of 50%). The example tables provided herein (for example, Table 1) may be implemented as matrices so as to enable more efficient parallel processing. Example matrix implementations are also disclosed in relation to each step of the method 200. In the example of Table 1, investment E is not held in the first portfolio and is held in the benchmark portfolio. Accordingly, investment E (and the corresponding returns etc. discussed later) may correspond to a single investment or, alternatively, may correspond to a dummy investment representing a plurality of investments.

For simplicity, basic examples of portfolios are provided herein. For example, Table 1 shows example portfolios comprising a single weight for each investment for the first period of time (rather than a weight for each time interval of the first period of time). It is to be understood that methods (e.g. the method 200) disclosed herein may be applied to more complex inputs and/or portfolios, for example, input portfolios comprising a plurality of weights for each investment, where each weight (of the plurality of weights) corresponds to a time interval of the plurality of time intervals of the first time period. As an example of how the method 200 may be applied to more complex inputs, matrices used in a matrix implementation of the method 200 may each have an increased number of dimensions than those described here. In other words, where an example discussed in relation to Table 1 comprises a matrix and the matrix is a one-dimensional matrix, the matrix may alternatively be a higher dimension matrix (e.g. two-dimensional) to allow for the representation of further input data (e.g. a plurality of weights for each investment and for each time interval of the first period of time) and additional or alternative matrix operations may be used to manipulate the higher dimension matrix (e.g. matrix multiplication and/or the transposing of matrices may be used). Likewise, while the example of the method 200 refers to first ($f_1$) and second ($f_2$) factors as scalar values, the first and second factor may alternatively be matrices. Bold typeface, as used herein, is used to signify the character represents a matrix. Typically, in an example matrix implementation, a matrix relates to either a set of weights or a set of returns and is referred to herein as a weight matrix or return matrix, respectively.

TABLE 1

An example of a first portfolio, a benchmark portfolio and the corresponding research portfolio. Weights are fractional.

|  | Investment A | Investment B | Investment C | Investment D | Investment E |
|---|---|---|---|---|---|
| First portfolio weight | 0.5 | 0.25 | 0.1 | 0.15 | 0.0 |
| Benchmark portfolio weight | 0.4 | 0.05 | 0.15 | 0.0 | 0.4 |
| Active weight | 0.1 | 0.2 | −0.05 | 0.15 | −0.4 |
| Selected? | Y | Y | N | Y | N |
| $f_1$ | $\frac{1-\sum_{i=1}^{n_s} w_i^b}{n_s} = \frac{1-(0.4+0.05+0)}{3} = \frac{0.55}{3} = 0.18\dot{3}$ | | | | |
| $f_2$ | $1-\sum_{i=1}^{n_{ns}} w_i^p = 1-(0.1+0.0) = 0.9$ | | | | |
| Research portfolio weight | 0.525 | 0.21 | 0.1 | 0.165 | 0 |

At step 201, a set of selected investments from the first portfolio may be identified. Identifying a set of selected investments may comprise identifying an investment as selected if a weight of the investment held in the first portfolio is greater than a corresponding weight of the investment held in the benchmark portfolio at any point during the first period of time (or, when the method 100 comprises one or more recalculations, the corresponding time intervals to which the calculation or recalculation relates).

In other words, for each investment of the first portfolio, the active weight may be calculated in comparison with the benchmark portfolio. Calculating the active weight may comprise subtracting the corresponding weight of the investment in the benchmark portfolio from the weight of the investment in the first portfolio. Each investment in the first portfolio with a positive active weight (i.e. greater than zero) may then be identified as selected. Table 1 shows a set of example active weights calculated for the example first portfolio and benchmark portfolio (in Table 1). Investments A, B and D correspond to positive active weights and are thus identified as selected.

In an example matrix implementation which may beneficially be run on a GPU, the first portfolio may be represented by a first portfolio weight matrix, $w^p$, and the benchmark portfolio may be represented by a benchmark portfolio weight matrix, $w^b$. Using the example of Table 1, the first portfolio weight matrix, $w^p$, may be a 1*5 matrix (i.e. with one row and five columns) with values of (0.5, 0.25, 0.1, 0.15, 0.0) and the benchmark portfolio weight matrix, $w^b$, may be a 1*5 matrix with values of (0.4, 0.05, 0.15, 0.0, −0.4). Identification 201 of the selected investments may comprise subtraction of the benchmark portfolio weight matrix, $w^b$, from the first portfolio weight matrix, $w^p$, and the elements of the resulting matrix with a positive value may be identified as selected. Which investments are selected may be represented in a Boolean matrix representation of the selection of investments, $B^s$. In other words, which investments are selected may be represented by a matrix where each matrix element has a value of either one or zero. For example, each element (in the Boolean matrix representation of the selection of investments, $B^s$) may correspond to whether the corresponding investment has been identified as selected or not and is given a value of 1 or not, respectively. In the example of Table 1, the Boolean matrix representation of the selection of investments, $B^s$, may be 1*5 matrix with values of (1, 1, 0, 1, 0).

Alternatively or additionally, an investment may be selected if the investment is held in the first portfolio for longer than a minimum period or held during at least one particular time interval. For example, an investment may only be identified as selected if the investment is held for longer than 5 trading days or is held at the end of the month.

Alternative or additionally, an investment may be selected if the investment is held in the first portfolio with a minimum weight. For example, an investment may only be identified as selected if the investment is held in the first portfolio of a weight greater than 0.1% or 0.01%.

Alternative or additionally, an investment may be selected if the investment is held in the first portfolio with a minimum active weight compared to the benchmark portfolio. For example, an investment may only be identified as selected if the investment is held in the first portfolio with an active weight of greater than 0.1% or 0.5%.

Alternative or additionally, an investment may be selected if the investment relates to a particular sector, market and/or country. For example, an investment may only be identified as selected if the investment relates to the transport sector or the USA. It will be appreciated that combinations of the criteria discussed above (or others) may be used for determining which investments are selected investments.

At step 203, a first factor, $f_1$, may be calculated. The first factor $f_1$ may be calculated as:

$$f_1 = \frac{1-\sum_{i=1}^{n_s} w_i^b}{n_s}$$

where i is an index for each selected investment, $n_s$ is a number of investments in the set of selected investments and $w_i^b$ is a corresponding weight in the benchmark portfolio of each investment in the set of selected investments (i.e. the ith element of the benchmark portfolio weight matrix, $w^b$). In other words, a sum of weights of each selected investment in the benchmark portfolio is calculated, the sum is subtracted from one and then the result is divided by a count of the selected investments.

In an example matrix implementation which may beneficially be run on a GPU, the first factor, $f_1$, may be calculated 203 as:

$$f_1 = \frac{1 - w^b \cdot B^s}{B^s \cdot B^s}$$

where · is the matrix dot product (i.e. the scalar product). In an example implementation, the matrix calculations may be offloaded to one or more accelerator processor cores (such as GPUs) and the results may be returned to a CPU for further processing (e.g. the subtraction from 1). For example, for the benchmark portfolio shown in Table 1, and the example the benchmark portfolio weight matrix, $w^b$, and Boolean matrix representation of the selection of investments, $B^s$, discussed above, the dot product of the benchmark portfolio weight matrix, $w^b$, and the Boolean matrix representation of the selection of investments, $B^s$, provides the result of 0.45. The value of 0.45 is equivalent to the sum, for each selected investment, of weights of each corresponding investment in the benchmark portfolio. The result of the multiplication may be subtracted from 1 and then divided by the count of the selected investments to calculate the first factor $f_1$ as 0.183 (as rounded to three decimal places). In the example in which the Boolean matrix representation of the selection of investments, $B^s$, is used, the count of the selected investments may be equivalent to the matrix dot product $B^s \cdot B^s$ (i.e. the dot product of the Boolean matrix representation of the selection of investments, $B^s$, with itself).

At step 205, a second factor, $f_2$, may be calculated. The second factor may be calculated as:

$$f_2 = 1 - \sum_{i=1}^{n_{ns}} w_i^p$$

where i is an index corresponding to each investment which is not selected, $n_{ns}$ is a number of investments held in the first portfolio that are not in the set of selected investments and $w_i^p$ is a weight of each investment held in the first portfolio that is not in the set of selected investments (i.e. the ith element of the first portfolio weight matrix). In other words, for each investment not selected, a sum of the weights of the corresponding investments in the first portfolio is calculated. The result of the sum may be subtracted from 1.

In an example matrix implementation which may beneficially be run on a GPU, the second factor $f_2$ may be calculated 205 as:

$$f_2 = 1 - w^p \cdot B^{ns}$$

where $B^{ns}$ is a Boolean matrix representation of which investments are not selected. The Boolean matrix representation of which investments are not selected, $B^{ns}$, may be calculated from the Boolean matrix representation of the selection of investments, $B^s$. For example, the Boolean matrix representation of which investments are not selected, $B^{ns}$, may be calculated from the Boolean matrix representation of the selection of investments, $B^s$, by inverting the Boolean values (i.e. for each element, swapping values of 0 for 1 and vice versa). In other words, the Boolean matrix representation of the selection of investments, $B^s$, and Boolean matrix representation of which investments are not selected, $B^{ns}$, when added together (i.e. an entrywise sum) may produce a matrix with every element having a value of 1. Continuing the example shown in Table 1, the Boolean matrix representation of which investments are not selected, $B^{ns}$, may be a 1*5 matrix with values of (0, 0, 1, 0, 1). The dot product of the first portfolio weight matrix, $w^p$, and the Boolean matrix representation of which investments are not selected, $B^{ns}$, produces the result of 0.1 i.e. a value equivalent to the sum, for each investment not selected, of the weights of the corresponding investments in the first portfolio. The result of the dot product may be subtracted from 1 to calculate the value of the second factor, $f_2$, as 0.9.

At step 207, for each selected investment, a corresponding weight of the investment in the research portfolio may be determined. For each selected investment, a corresponding weight of the investment in the research portfolio, $w_j^{r,s}$, (i.e. the weights of the research portfolio may represented in a one-dimensional research portfolio weight matrix, $w^r$, and $w_j^{r,s}$ is the jth element of the research portfolio weight matrix corresponding to a selected investment) may be determined 207 as:

$$w_j^{r,s} = (f_1 + w_j^b) \times f_2$$

where j is an index corresponding to each selected investment and $w_j^b$ is the corresponding weight of the investment in the benchmark portfolio. In other words, for each selected investment, the weight of the investment in the research portfolio is determined as the sum of the first factor and the corresponding weight of the investment in the benchmark portfolio, both multiplied by the second factor.

In the example of Table 1, the investments A, B and C are selected and held with weights in the benchmark portfolio of 0.4, 0.05 and 0.0, respectively, and the factors $f_1$ and $f_2$ have been determined as 0.183 and 0.9, respectively. The weight of investment A for the research portfolio is therefore calculated as (0.183+0.4)*0.9=0.525. Likewise, the weights of investments B and D for the research portfolio are calculated as (0.183+0.05)*0.9=0.210 and (0.183+0.0)*0.9=0.165, respectively.

In an example matrix implementation which may beneficially be run on a GPU, the elements (i.e. the corresponding weights) of the matrix representation of the research portfolio weights, $w^r$, may be determined 207 using a first formula of:

$$w^r \rightarrow (f_1 B^s + w^b) \circ (f_2 B^s)$$

where $\rightarrow$ indicates the first formula is not a complete equation (i.e. additional terms, described below, are needed to properly determine the matrix representation of the research portfolio weights, $w^r$) and $\circ$ is the Hadamard product (i.e. the element-wise product). In the example of Table 1, the first factor, $f_1$, and second factor, $f_2$, are scalar and the corresponding multiplication with the Boolean matrix representation of the selection of investments, $B^s$, is treated as scalar multiplication of a matrix. A non-zero element of the matrix produced by the first formula corresponds to a weight for the research portfolio for the corresponding (selected) investment.

For example, using the example of Table 1, $f_2$ has a value of 0.9, the Boolean matrix representation of the selection of investments, $B^s$, has values of (1, 1, 0, 1, 0) and the corresponding result of the scalar multiplication $(f_2 B^s)$ is (0.9, 0.9, 0, 0.9, 0). Accordingly, the corresponding result of $(f_1 B^s + w^b)$ is (0.583, 0.233, 0.333, 0.183, 0.583). The Hadamard product takes a first and second matrix (each of the same dimensions) and produces a third matrix (of the same dimensions as the first and second matrix), where each element is the product of the corresponding elements of the first and second matrix. Accordingly, the result of the first formula is (0.525, 0.21, 0, 0.165, 0). In other words, the weights for investments A, B and D (i.e. the selected investments) in the research portfolio are 0.525, 0.21 and 0.165, respectively.

At step 209, for each investment in the first portfolio not in the set of selected investments, a corresponding weight of the investment in the research portfolio may be determined. For each investment in the first portfolio not in the set of selected investments, the corresponding weight of the investment in the research portfolio, $w_k^{r,ns}$, may be determined 209 as:

$$w_k^{r,ns} = w_k^p$$

Where $w_k^p$ as the weight of the investment in the first portfolio and k is an index that corresponds to each investment held in the first portfolio which is not selected. In other words, for investments that are not selected and are held in the first portfolio, the weight of each corresponding investment in the research portfolio is determined as the weight of the investment in the first portfolio. In the example of Table 1, investment C is not selected but is held (i.e. with a non-zero weight or size) in the first portfolio with a weight of 0.1. Therefore, the weight of investment C in the research portfolio is determined as 0.1.

In an example matrix implementation which may beneficially be run on a GPU, the research portfolio weights corresponding to investments not selected and held in the first portfolio, may be determined 209 using a second formula of:

$$w^r \rightarrow w^p \circ B^{ns}$$

For example, using the example of Table 1, the Boolean matrix representation of which investments are not selected, $B^{ns}$, has values of (0, 0, 1, 0, 1), the first portfolio weight matrix, $w^p$, has values of (0.5, 0.25, 0.1, 0.15, 0.0) and so the corresponding result of the Hadamard product is (0.0, 0.0, 0.1, 0.0, 0.0). In other words, the weight of investment C (an investment held in the first portfolio and not held in the benchmark portfolio) in the research portfolio is 0.1.

At step 211, for each investment not held in the first portfolio, a corresponding weight of the investment in the research portfolio, $w_l^{r,nh}$, may be determined. For each investment not held in the first portfolio, the corresponding weight of the investment in the research portfolio, $w_l^{r,nh}$, may be determined as:

$$w_l^{r,nh} = 0$$

where l is an index that corresponds to each investment not held in the first portfolio.

In other words, if an investment is not held in the first portfolio, the corresponding weight in the research portfolio may be set to zero. Referring again to the example of Table 1, investment E is not held in the first portfolio (i.e. the corresponding first portfolio weight is zero) and therefore the corresponding research portfolio weight is 0.

In an example matrix implementation which may beneficially be run on a GPU, the research portfolio weights corresponding to investments not held in the first portfolio, may be determined 211 using a third formula of:

$$w^r \rightarrow O$$

where O is a null matrix (i.e. a zero matrix or a matrix where all elements are zero) with dimensions corresponding to the dimensions of the research portfolio weight matrix, $w^r$.

In an example matrix implementation which may beneficially be run on a GPU, the method 200 may further comprise determining the research portfolio weight matrix (for a single time interval), $w^r$, as the sum of the first, second and, optionally, third formula:

$$w^r = (f_1 B^s + w^b) \circ (f_2 B^s) + w^p \circ B^{ns} + O$$

As the third formula typically corresponds to a null matrix (in the presently described example), the inclusion of the third formula is optional. In the example of Table 1, summing the first, second and third formula provides the result of (0.525, 0.21, 0.1, 0.165, 0) where each element corresponds to the weight of the investments (i.e. investment A, investment B, investment C, investment D and investment E, respectively) in the research portfolio.

Typically, the first portfolio comprises a small number of investments, each held with a relatively large weight, and the benchmark portfolio comprises a large number of investments, each with a relatively small weight. For such an example (i.e. where many or all investments held in a first portfolio are held with a weight greater than the corresponding weight in a benchmark portfolio), at the selection step 201, all of the investments held in the first portfolio may be selected. When all of the investments held in the first portfolio are selected, the first factor, $f_1$, (calculated at step 203) is equivalent to the average of the active weights of each investment held in the first portfolio (when compared to the corresponding weights in the benchmark portfolio) and the second factor, $f_2$, (calculated at step 205) is equivalent to one. Therefore, at step 207, the weight of each investment in the research portfolio that is held in the first portfolio is determined as a weight of the sum of the corresponding weight in the benchmark portfolio and the average of the active weights of each investment held in the first portfolio. There are no investments held in the first portfolio that are not selected so no corresponding weights are determined at step 209. At step 211, for investments not held in the first portfolio, a corresponding weight of investments in the research portfolio are determined as zero. Accordingly, the method 200 may be referred to as 'equally-active weighting' and the research portfolio may be referred to as an 'equally-active weighted portfolio.'

Beneficially, the research portfolio is constructed such that the same investments are held as in the first portfolio and the size of each investment (held in the research portfolio) is not directly determined by the corresponding size of the investment in the first portfolio. In other words, the research portfolio corresponds to the same investments as the investments held in the first portfolio with corresponding 'neutral' sizing. Constructing the research portfolio in this way allows the analysis of the first portfolio to determine characteristics relating to the investments.

As an alternative to equally-active weighting the research portfolio may be constructed such that the weights of selected investment are: equal absolute weights; proportional to the market capitalisation of the investment (i.e. the total value of all units of each investment); inversely proportional to a measure of volatility of the investment; or inversely proportion to a measure of liquidity (e.g. average volume available for trade in a given time period). Further alternative methods of constructing the research portfolio will be known to the skilled person.

Referring again to FIG. 2, the method 200 may further comprise a duplication step and/or a recalculation step (as discussed above in relation to the method 100). As discussed above, the first portfolio and/or the benchmark portfolio may comprise a plurality of weights for each investment with each weight for each investment corresponding to, for example, a different day (or more generally, a time interval) and the research portfolio may be recalculated at on one or more days (for example, once a month). In such an example, the research portfolio weight matrix, $w^r$, may be a two-dimensional matrix with, for example, columns corresponding to each investment, rows corresponding to each time interval and elements corresponding to the weight for the particular investment for the particular time interval. For a time interval for which weights of the research portfolio have been calculated or recalculated, the elements in a row corresponding to the time interval may be set to the weights determined by the calculation or recalculation.

In some embodiments, recalculation can be performed periodically. In some embodiments, recalculation can be performed in real-time or in a streaming fashion. For instance, recalculation can be performed responsive to updates or other changes to a first portfolio, a benchmark portfolio, or both. In some embodiments, real-time recalculation can be performed in a parallelized fashion, such that a plurality of processors (e.g., real or virtual CPUs, GPUs, FPGAs, etc.) can perform parallel recalculation of weights in real-time or otherwise responsively to updates or changes in the portfolios being simulated. In this manner, for instance, the highly parallelizable architectures implemented by example methods of the present disclosure can provide for improved simulation and modelling with improved processing efficiency.

In some embodiments, for a time interval for which the weights of the research portfolio have not been calculated or recalculated, the elements in a row corresponding to the time interval may be set to be the same value as those on the immediately previous row (i.e. the row above). In other words, when the weights of the research portfolio have not been recalculated for a particular time interval, the elements in a row (of the research portfolio weight matrix, $w^r$) may contain duplicate weights. In an example where the time intervals correspond to days and the research portfolio weights are calculated on day one and recalculated on day thirty, elements of a first row (corresponding to the first day) of the research portfolio weight matrix, $w^r$, may comprise the calculated weights, the elements of the first row may be copied (i.e. duplicated) to rows two to twenty-nine (corresponding to days two to days twenty-nine) and the research portfolio weights may be recalculated which may provide weights for the thirtieth row (corresponding to day thirty). As a different example, Table 2 shows the weights for the research portfolio calculated in the previous example and the weights for day one have been duplicated for day two (i.e. no recalculation occurred). For example, Table 2 shows the weight for investment A for day one is the same value as the weight for investment A for day two (0.52).

TABLE 2

Example research portfolio weights for a two-day period corresponding to the example shown in Table 1.

| | Investment A | Investment B | Investment C | Investment D | Investment E |
|---|---|---|---|---|---|
| Day one research portfolio weight | 0.525 | 0.21 | 0.1 | 0.165 | 0 |
| Day two research portfolio weight | 0.525 | 0.21 | 0.1 | 0.165 | 0 |

TABLE 3

Example first portfolio weights for a two-day period corresponding to the example shown in Table 1

| | Investment A | Investment B | Investment C | Investment D | Investment E |
|---|---|---|---|---|---|
| Day one first portfolio weight | 0.5 | 0.25 | 0.1 | 0.15 | 0 |
| Day two first portfolio weight | 0.5 | 0.25 | 0.1 | 0.15 | 0 |

TABLE 4

Example benchmark portfolio weights for a two-day period corresponding to the example shown in Table 1

| | Investment A | Investment B | Investment C | Investment D | Investment E |
|---|---|---|---|---|---|
| Day one benchmark portfolio weight | 0.4 | 0.05 | 0.15 | 0.0 | 0.4 |
| Day two benchmark portfolio weight | 0.4 | 0.05 | 0.15 | 0.0 | 0.4 |

TABLE 5

Example absolute returns corresponding to the example of Table 1

| | Investment A | Investment B | Investment C | Investment D | Investment E |
|---|---|---|---|---|---|
| Day one absolute return (%) | 2.1 | 1 | −1 | 5 | 1 |
| Day two absolute return (%) | 2 | −1 | −1.1 | 4.9 | 1.1 |

The method 100 may comprise determining a relative return for each investment in the first portfolio and for each time interval of the first period of time. Tables 3 and 4 shows example first portfolio weights and benchmark portfolio weights, respectively, for a two-day period which will be referred to in the example below.

Determining a relative return for each investment in the first portfolio and for each time interval of the first period of time may comprise determining a total absolute return for the benchmark portfolio (i.e. a benchmark total absolute return) for each time interval, comprising a sum of an absolute return for each investment multiplied by the corresponding weight of the investment in the benchmark portfolio. In other words, the total absolute returns for the benchmark portfolio for each time interval may be equivalent to:

$$\sum_{i=1}^{n_b} w_j^b R_j^a$$

Where j is an index corresponding to each investment in the benchmark portfolio, $n_b$ is a number of investment held in the benchmark portfolio, $w_j^b$ is the weight of the jth investment in the benchmark portfolio and $R_j^a$ is the absolute return of the jth investment. Table 5 shows example absolute returns for the investments in the example first portfolio and example benchmark portfolio shown in Table 1. As an example of determining a total absolute return, the total absolute return for day one for the benchmark portfolio of Table 4 may be determined by summing the product of each absolute return (shown in Table 5) with the corresponding weight in the benchmark portfolio (shown in Table 4) i.e. 2.1*0.4+1*0.05+−1*0.15+5*0+1*0.4=1.14. The total absolute returns for Table 4 are shown in Table 6.

TABLE 6

Example total absolute returns
corresponding to the example of Table 1

| | All investments |
|---|---|
| Day one benchmark total absolute return (%) | 1.14 |
| Day two benchmark total absolute return (%) | 1.025 |

Determining a relative return for each investment in the first portfolio and for each time interval of the first period of time may further comprise determining, for each investment in the first portfolio and for each time interval, a corresponding relative return as the difference between an absolute return of the investment for the time interval and the total absolute return for the benchmark portfolio corresponding to the time interval. In other words, for each investment and each time interval, the corresponding benchmark total absolute return is subtracted from the absolute return of the investment. Continuing the example shown in Tables 5 and 6, the day one benchmark total absolute return (1.14%) is subtracted from the day one absolute return for investment A (2.1%) to give a day one relative return for investment A of 0.96%. Table 7 shows relative returns corresponding to the example of Table 1. Beneficially, the relative returns, when calculated in this way, demonstrate the performance of each investment relative to the total benchmark absolute return. In other words, investments that are contributing a positive value to the alpha will have a positive relative return and vice versa.

TABLE 7

Example relative returns corresponding to the example of Table 1

| | Investment A | Investment B | Investment C | Investment D | Investment E |
|---|---|---|---|---|---|
| Day one relative return (%) | 0.96 | −0.14 | −2.14 | 3.86 | −0.14 |

TABLE 7-continued

Example relative returns corresponding to the example of Table 1

| | Investment A | Investment B | Investment C | Investment D | Investment E |
|---|---|---|---|---|---|
| Day two relative return (%) | 0.975 | −2.025 | −2.125 | 3.875 | 0.075 |

In an example matrix implementation which may beneficially be run on a GPU, determining an total absolute return for the benchmark portfolio may be calculated as a sum across each row of the matrix resulting from:

$$w^b \circ R^a$$

where the absolute returns may be represented by a matrix (i.e. an absolute return matrix, $R^a$). The total absolute return may be subtracted from each element of the absolute return matrix, $R^a$, to determine a relative return matrix, $R^{rel}$.

Figure 3:
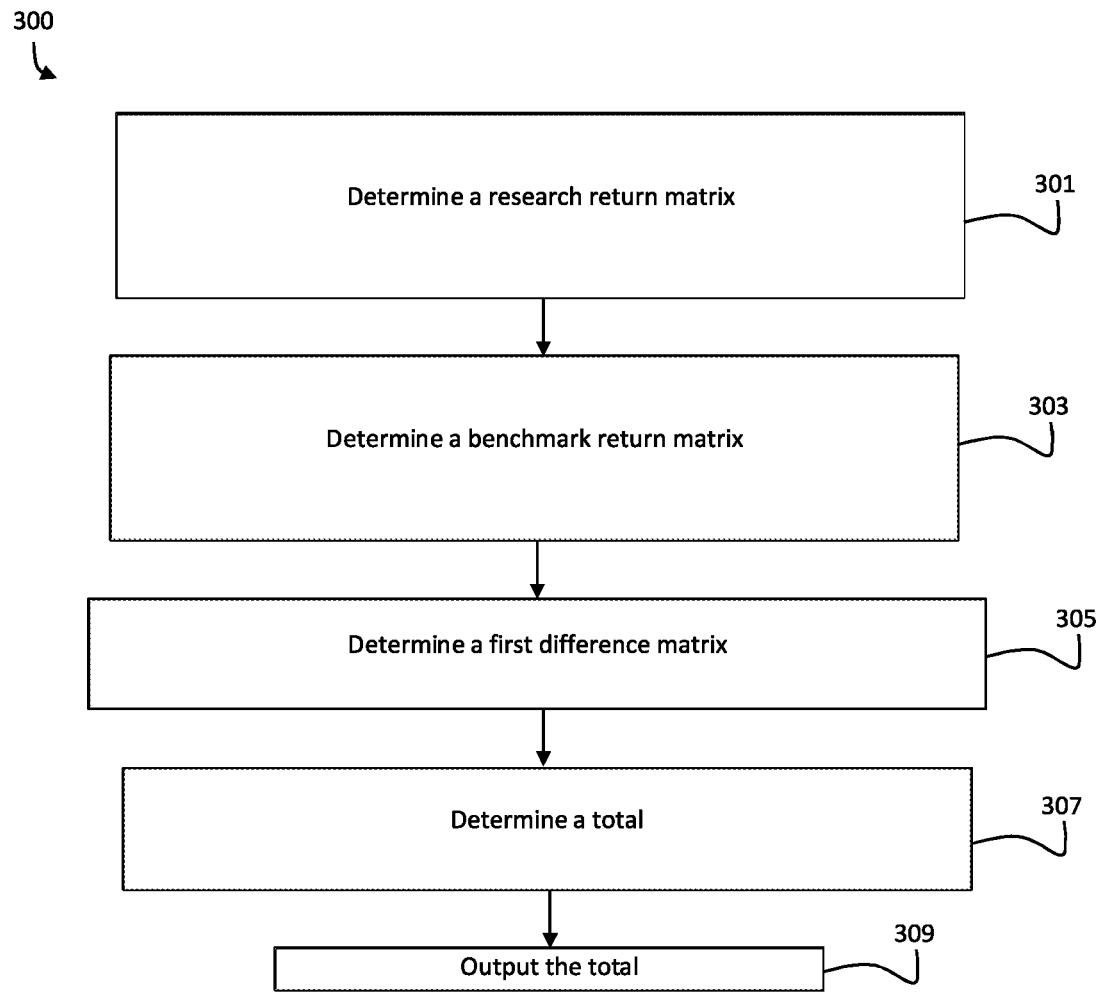
FIG. 3 depicts an example of a computer-implemented method for determining a first difference return matrix.

FIG. 3 depicts an example of a computer-implemented method 300 for determining a first difference return matrix and, optionally, outputting a total.

At step 301, a research return matrix, $R^r$, is determined. Determining 301 the research return matrix, $R^r$, comprises for each investment and for each time interval, multiplying the relative returns of the investment for the time interval by the corresponding weight of the investment in the research portfolio. In other words, (hypothetical) relative returns provided by the research portfolio are calculated on, for example, on a day-by-day and investment-by-investment basis.

Table 8 shows an example research return matrix, $R^r$, for the example research portfolio weights shown in Table 1 and the example relative returns shown in Table 5. For each investment and each day, the corresponding weight of the investment in the research portfolio is multiplied by the corresponding relative returns. As an example, the research portfolio weight for investment A (of 52.5%) is multiplied with the corresponding relative return for day one (of 0.96%) to calculate a day one research return for investment A of 0.504%.

In an example matrix implementation which may beneficially be run on a GPU, determination 301 of the research return matrix, $R^r$, may comprise use of the Hadamard product of the research portfolio weight matrix, $w^r$, with the relative return matrix, $R^{rel}$:

$$R^r = w^r \circ R^{rel}$$

In other words, each element of the research portfolio weight matrix, $w^r$, is multiplied by corresponding element (i.e. the element corresponding to the same investment and the same time interval) of the relative return matrix, $R^{rel}$.

TABLE 8

An example research return matrix, $R^r$,
corresponding to the example of Table 1.

| | Investment A | Investment B | Investment C | Investment D | Investment E |
|---|---|---|---|---|---|
| Day one research return (%) | 0.504 | −0.0294 | −0.214 | 0.6369 | 0 |

TABLE 8-continued

An example research return matrix, $R^r$, corresponding to the example of Table 1.

|  | Investment A | Investment B | Investment C | Investment D | Investment E |
|---|---|---|---|---|---|
| Day two research return (%) | 0.51188 | −0.4253 | −0.2125 | 0.63938 | 0 |

At step 303, a benchmark return matrix, $R^b$, is determined. Determining 303 the benchmark return matrix, $R^b$, comprises, for each investment and for each time interval, multiplying the relative return of the investment for the time interval by the corresponding weight of the investment in the benchmark portfolio. In other words, the returns corresponding to the benchmark portfolio are calculated.

Table 9 shows an example benchmark return matrix, $R^b$, corresponding to the example benchmark portfolio shown in Table 1 and the example relative returns shown in Table 5. As an example, the benchmark portfolio weight for investment A (of 40%) is multiplied with the corresponding relative return for day one (of 0.96%) to calculate a day one benchmark return for investment A of 0.384%. Note each row in Table 9 sums to 0 as the (total) relative return of the benchmark is zero.

In an example matrix implementation which may beneficially be run on a GPU, the benchmark return matrix, $R^b$, may be determined 303 using similar methods to the determination 301 of the research return matrix, $R^r$, (except using the benchmark portfolio weight matrix, $w^b$, in place of the research portfolio weight matrix, $w^r$):

$$R^b = w^b \circ R^{rel}$$

TABLE 9

An example benchmark return matrix, $R^b$, corresponding to the example of Table 1.

|  | Investment A | Investment B | Investment C | Investment D | Investment E |
|---|---|---|---|---|---|
| Day one benchmark return (%) | 0.384 | −0.007 | −0.321 | 0 | −0.056 |
| Day two benchmark return (%) | 0.39 | −0.101 | −0.319 | 0 | 0.03 |

At step 305, a first difference return matrix, $R^{r-b}$, is determined. The first difference return matrix, $R^{r-b}$, corresponds to the difference between the research return matrix, $R^r$, and the benchmark return matrix, $R^b$. In other words, each entry in the first difference return matrix, $R^{r-b}$, corresponds to a relative return that would be provided by the research portfolio compared to the benchmark portfolio for each investment and each time interval (e.g. each day). Each element in the first difference return matrix, $R^{r-b}$, may be referred to as a first difference return. An example first difference return matrix, $R^{r-b}$ is shown in Table 10. For example, the day one benchmark return for investment A (0.384%) is subtracted from the corresponding research return (0.504%) to calculate a corresponding value for the first difference return of 0.12%.

TABLE 10

An example first difference return matrix, $R^{r-b}$, corresponding to the example of Table 1.

|  | Investment A | Investment B | Investment C | Investment D | Investment E |
|---|---|---|---|---|---|
| Day one first difference return (%) | 0.12 | −0.022 | 0.107 | 0.637 | 0.056 |
| Day two first difference return (%) | 0.122 | −0.324 | 0.106 | 0.639 | −0.03 |

In an example matrix implementation which may beneficially be run on a GPU, determination 305 of the first difference return matrix, $R^{r-b}$, may comprise the subtraction (i.e. the entry-wise subtraction) of the benchmark return matrix, $R^b$, from the research return matrix, $R^r$:

$$R^{r-b} = R^r - R^b$$

The first difference return matrix, $R^{r-b}$, may be provided as an output. Additionally or alternatively, a total may be determined and provided as an output. The total may correspond to the binary characteristic and may be referred to as the binary total (i.e. the total may provide an indication on how well the portfolio manage has made decisions in relation to the decisions to invest or not invest in investments).

At step 307, optionally, a total is determined. The total may be a binary total and may be determined 307 as a sum across the first difference return matrix, $R^{r-b}$, i.e. over each investment over each time interval of the first period of time. Determining 307 the binary total may comprise, for each row (where each row corresponds to a day), summing across each element of the row of the first difference return matrix, $R^{r-b}$, to determine a sub-total return matrix comprising a single column, where each element in the single column corresponds to a sub-total of the first difference return matrix, $R^{r-b}$ corresponding to a single day. An example sub-total return matrix is shown in Table 11. For example, the total day one first difference returns correspond to the total of the day one first difference return matrix, $R^{r-b}$, shown in Table 10. Determining 307 the binary total may comprise summing each element in the sub-total matrix. For example, the total day one first difference returns and the total day two first difference returns may be summed together to determine a binary total of 1.411%.

One or more column matrices (i.e. matrices with one column and one or more rows) and the dot product may be used to calculated total or sub-totals of matrices (i.e. calculate/determine sums across matrices). Each column matrix may have every element with a value of one, or alternatively, one or more elements may have a value of zero to enable the corresponding elements to be ignored in the matrix being summed.

TABLE 11

An example sub-total matrix corresponding to the example first difference return matrix, $R^{r-b}$, shown in Table 10

|  | All investments |
| --- | --- |
| Day one first difference returns (%) | 0.8975 |
| Day two first difference returns (%) | 0.5135 |

At step 309, optionally, the total (i.e. the binary total) is output. The total may provide an indication of the performance of the decisions of whether to invest or not invest in each of the first investments in the first portfolio during the first period of time. In other words, due to the research portfolio being a weight agnostic position, differences between the returns of the research portfolio and the returns of the benchmark portfolio can be attributed to the binary investment decisions (i.e. whether to invest in each investment or not). The binary total therefore captures a component of a performance that relates to the 'binary' characteristic.

As discussed above, the methods taught herein may be further manipulated to determine a corresponding characteristic for two or more bins of time. As an example, of determining a corresponding characteristic for two or more bins of time, the day one first difference returns (0.8975%, shown in Table 11) may be provided as a binary total for the first day and the day one second difference returns (0.5135%) may be provided as a binary total for the second day.

In some examples, a total (e.g. the binary total determined in step 307 or other totals discussed below) may be calculated for a time period starting from a time interval other than the first time interval of the first period of time. For example, each time interval may correspond to a day and the first period of time may begin on day one of the first period of time, a total may be calculated for a period of time starting on, for example, day thirty or day three-hundred and sixty-five. In such an example, a compounding term (i.e. f(t)) may be used to allow each of the corresponding matrix elements to be summed linearly. For example, the compounding term may describe the prior compounded relative performance of one or more investments. An example of such a compounding term may be:

$$f(t) = \prod_{\tau=1}^{t-1}(1 + p(\tau))$$

where $p(\tau)$ is the relative return of the portfolio on day $\tau$.

Additionally or alternatively, determining 307 a total may comprise determining a 'selected-binary' total i.e. a total corresponding to decisions where the portfolio manager has decided to invest (or not invest) in selected investments. Determining 307 the selected-binary total may comprise a sum of the first difference return matrix, $R^{r-b}$, over each investment in the research portfolio that is identified as selected and over each time interval of the first period of time. In other words, a sum is performed over the first difference return matrix, $R^{r-b}$, (i.e. as determined in step 305) that only includes selected investments (and doesn't included investments which aren't selected). Using the example of Table 1, investments A, B and D are selected. Therefore the selected-binary total corresponding to the example of first difference return matrix, $R^{r-b}$, shown in Table 10 would sum only the entries corresponding to investments A, B and D and, accordingly, would have a value of 1.17175%.

In an example matrix implementation which may beneficially be run on a GPU, determination 307 of the selected-binary total may comprise the use of the Boolean matrix representation of the selection of investments, $B^s$ and the first difference return matrix, $R^{r-b}$. For example, if the Boolean matrix representation of the selection of investments, $B^s$, is a one-dimensional matrix (i.e. a 1*5 matrix as discussed above), a two-dimensional Boolean matrix representation of the selection of investments, $B_{2D}^s$, may be constructed by duplicating rows in a manner similar to the duplication step discussed in relation to the method 200 such that the dimensions (of the two-dimensional Boolean matrix representation of the selection of investments, $B_{2D}^s$) match the first difference return matrix, $R^{r-b}$. In examples where the research portfolio is recalculated, the Boolean matrix representation of the selection of investments, $B^s$, may comprise more than one row and/or there may be multiple Boolean matrix representations of the selection of investments, $B^s$, (each corresponding to each calculation/recalculation) and the construction of the two-dimensional Boolean matrix representation of the selection of investments, $B_{2D}^s$, may be adjusted accordingly as will be clear to the skilled person. The selected-binary total may then be determined by performing a sum across the result of:

$$B_{2D}^s \circ R^{r-b}$$

In other words, the selected-binary total may be the sum of the result of the Hadamard product with the two-dimensional Boolean matrix representation of the selection of investments, $B_{2D}^s$, and the first difference return matrix, $R^{r-b}$.

At step 309, the selected-binary total may be provided as an output. The selected-binary total may provide an indication of the contribution the selected investments provide to the binary total. In other words, the selected-binary total may indicate the impact of selected-binary decisions i.e. binary decisions where the portfolio manager has decided to invest, or not invest, in selected investment.

Additionally or alternatively, determining 307 a total may comprise determining a 'not-selected-binary' total i.e. a total corresponding to decisions where the portfolio manager has decided to invest (or not invest) in an investment that is not selected. Determining the not-selected-binary total may comprise a sum of the first difference return matrix over each investment held in the research portfolio that is not identified as selected and over each time interval of the first period of time. Using the example of Table 1, investments C and E are not selected. Therefore not-selected-binary total corresponding to the example of first difference return matrix, $R^{r-b}$, shown in Table 10 would sum only the entries corresponding to investments C and E and, accordingly, would have a value of 0.23925%.

In an example matrix implementation which may beneficially be run on a GPU, the not-selected-binary total may be determined 307 in a similar way to the method of determining 307 the selected-binary total, using the Boolean matrix representation of which investments are not selected, $B^{ns}$, in place of the Boolean matrix representation of the selection of investments, $B^s$. In other words, a two-dimensional Boolean matrix representation of the which investment are not selected, $B_{2D}^{ns}$, and the not-selected-binary total may then be determined by performing a sum across the result of:

$$B_{2D}^{ns} \circ R^{r-b}$$

At step 309, the not-selected-binary total is provided as an output. The not-selected-binary total may provide an indication of the contribution the investments not selected provide to the binary total. In other words, the not-selected-binary total may indicate the impact of not-selected-binary decisions i.e. binary decisions where the portfolio manager has decided to invest, or not invest, in an investment that is not selected.

When constructed as described herein, the selected-binary total and the not-selected-binary total sum to the binary total, allowing analysis of all of the alpha attributed to the binary characteristic.

Figure 4:
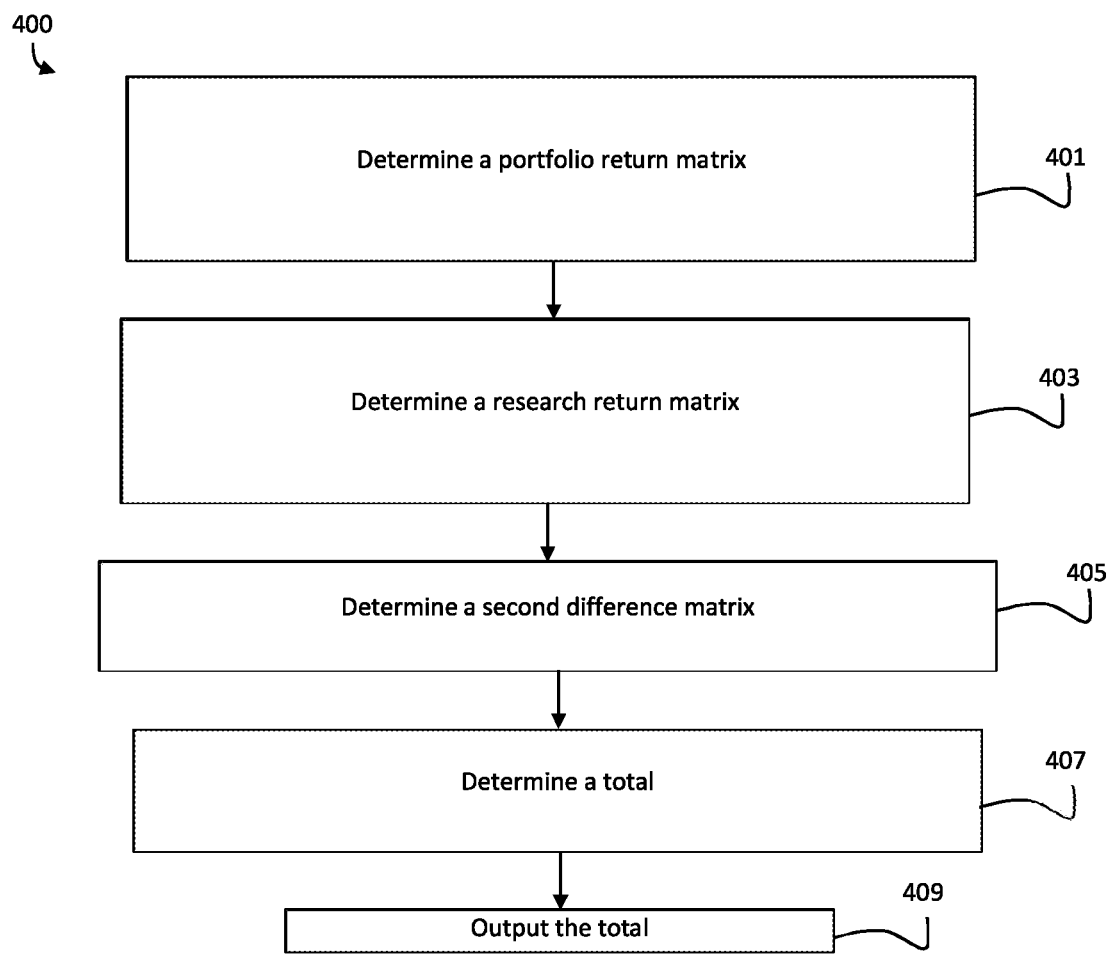
FIG. 4 depicts an example of a computer-implemented method for determining a second difference return matrix.

FIG. 4 depicts an example of a computer-implemented method for determining a second difference return matrix.

At step 401, a portfolio return matrix, $R^p$, is determined. Determining 401 the portfolio return matrix, $R^p$, comprises, for each investment and for each time interval, multiplying the relative return of the investment for the time interval by the corresponding weight of the investment in the first portfolio.

Table 12 shows an example portfolio return matrix, $R^p$, corresponding to the example first portfolio shown in Table 1 and the example relative returns shown in Table 5. As an example, the first portfolio weight for investment A (of 50%) is multiplied with the corresponding relative return for day one (of 0.96%) to calculate a day one portfolio return for investment A of 0.48%.

In an example matrix implementation which may beneficially be run on a GPU, determination 401 of the portfolio return matrix, $R^p$, may comprise use of similar methods to the determination 301 of the research return matrix, $R^r$, except using the first portfolio weight matrix, $w^p$, (i.e. in place of the research portfolio weight matrix, $w^r$):

$$R^p = w^p \circ R^{rel}$$

TABLE 12

An example portfolio return matrix, $R^p$, corresponding to the example of Table 1

|  | Investment A | Investment B | Investment C | Investment D | Investment E |
|---|---|---|---|---|---|
| Day one portfolio return (%) | 0.48 | −0.035 | −0.214 | 0.579 | 0 |
| Day two portfolio return (%) | 0.4875 | −0.5063 | −0.2125 | 0.58125 | 0 |

At step 403, a research return matrix, $R^r$, is determined. Determination 403 of the research return matrix, $R^r$, may comprise, for each investment and for each time interval, multiplying the relative return of the investment for the time interval by the corresponding weight of the investment in the research portfolio. The research return matrix, $R^r$, determined at step 403 may be identical, or determined in an identical method, as the research return matrix, $R^r$, determined at step 301. In other words the example research return matrix, $R^r$, shown in Table 8 with reference to step 301 may also correspond to step 403.

At step 405, a second difference return matrix, $R^{p-r}$, is determined. The second difference return matrix, $R^{p-r}$, corresponds to the difference between the portfolio return matrix, $R^p$, and the research return matrix, $R^r$. In other words, each entry in the second difference return matrix, $R^{p-r}$, corresponds to a relative return that would be provided by the first portfolio compared to the research portfolio for each investment and each time interval (e.g. each day). Each element in the second difference return matrix, $R^{p-r}$, may be referred to as a second difference return. An example second difference return matrix, $R^{p-r}$, is shown in Table 13. For example, the day one research return for investment A (0.504%) is subtracted from the corresponding portfolio return (0.48%) to calculate a corresponding value for the second difference return of −0.04%.

In an example matrix implementation which may beneficially be run on a GPU, determination 405 of the second difference return matrix, $R^{p-r}$, may comprise subtraction (i.e. the entry-wise subtraction) of the research return matrix, $R^r$, from the portfolio return matrix, $R^p$:

$$R^{p-r} = R^p - R^r$$

TABLE 13

An example second difference return matrix, $R^{p-r}$, corresponding to the example of Table 1

|  | Investment A | Investment B | Investment C | Investment D | Investment E |
|---|---|---|---|---|---|
| Day one second difference return (%) | −0.024 | −0.0056 | 0 | −0.0579 | 0 |
| Day two second difference return (%) | −0.0244 | −0.081 | 0 | −0.0581 | 0 |

The second difference return matrix, $R^{p-r}$, may be provided as an output. Additionally or alternatively, a total may be determined and provided as an output. The total may correspond to the sizing characteristic and may be referred to as the sizing total (i.e. the total may provide an indication on how well the portfolio manager has made decisions in relation to the sizing of investments).

At step 407, optionally, a total is determined. The total may be a sizing total and may be determined as a sum across the second difference return matrix, $R^{p-r}$, i.e. over each investment and over each time interval of the first period of time. The determination 407 of the sizing total may be carried out in a similar manner to the determination 307 of the binary total.

At step 409, optionally, the total is output. Outputting 409 the sizing total may be carried out in a similar manner to outputting 309 the binary total.

The sizing total may provide an indication of the performance of the decisions related to sizing of investments held in the first portfolio during the first period of time. In other words, due to the research portfolio being weight agnostic, differences in the returns corresponding to the research portfolio and the returns corresponding to the first portfolio can be attributed to the sizing decisions of the first portfolio. The sizing total therefore captures how much alpha can be attributed to the sizing decisions that resulted in the first portfolio.

When calculated and determined as disclosed above, the sum of the binary total and the sizing total corresponds to the total alpha (of the first portfolio) for the first period of time. Beneficially, all of the alpha (whether positive or negative) is therefore attributed to either a binary decision or a sizing decision and therefore the decisions that contribute to the alpha may be analysed.

Referring again to FIG. 1, the method 100 may further comprise, receiving, as input, a build time for determining a plurality of build intervals. The build time may be, for example, thirty days. For the example discussed below, a build time of ten days is used. The value of the build time may be used to determine whether the size of an investment is considered part of the initial sizing or is considered a change in the sizing (and subsequently attribute returns to either the initial sizing or a changing in the sizing). In other words, the build interval for an investment is when the portfolio manager is assumed to have reached the sizing they have been aiming to reach since investing in the investment i.e. in examples in which the build time is ten days, the size of the investment on the tenth day after the first day the investment was held is assumed to be the size the portfolio manager was aiming to reach.

Determining the plurality of build intervals may further comprise, for each investment held on the first time interval of the first period of time, determining the corresponding build interval as the first time interval of the first period of time. In other words, for investments that are held at the start of the first period of time, it may not be possible to identify when the investment was first held (as there is no information available on when the investment was not held prior to the first time interval) and so the build interval is taken as the first time interval of the first period of time. Table 14 shows an example research portfolio across a fifteen-day period. In the example of Table 14, Investment F is held on the first day and the build interval corresponding to investment F is therefore the first day (indicated by bold).

Determining the plurality of build intervals may further comprise, for each investment not held on the first time interval of the first period of time, determining the corresponding build interval as a time interval equivalent to the time interval an investment was first held on plus the build time. In other words, if the build time is ten days, the build interval is ten days after the investment was first held. In the example research portfolio of Table 14, Investments G and H are not held on the first day. Investment G is first held on day two and the build interval corresponding to investment G is day twelve (for a build time of ten days). Likewise, investment H is first held on day fourteen and the build interval corresponding to investment H is day twenty-four (not shown). Both the first time interval each investment is held and the build interval for each investment is indicated with bold in Table 14.

TABLE 14

An example research portfolio weight matrix, $w^r$

|  | Investment F | Investment G | Investment H |
|---|---|---|---|
| Day one first portfolio weight | 1 | 0 | 0 |
| Day two first portfolio weight | 0.5 | 0.5 | 0 |
| Day three first portfolio weight | 0.5 | 0.5 | 0 |
| Day four first portfolio weight | 0.5 | 0.5 | 0 |
| Day five first portfolio weight | 0.5 | 0.5 | 0 |
| Day six first portfolio weight | 0.5 | 0.5 | 0 |
| Day seven first portfolio weight | 0.5 | 0.5 | 0 |
| Day eight first portfolio weight | 0.5 | 0.5 | 0 |
| Day nine first portfolio weight | 0.5 | 0.5 | 0 |
| Day ten first portfolio weight | 0.5 | 0.5 | 0 |
| Day eleven first portfolio weight | 0.5 | 0.5 | 0 |
| Day twelve first portfolio weight | 0.5 | 0.5 | 0 |
| Day thirteen first portfolio weight | 0.5 | 0.5 | 0 |

TABLE 14-continued

An example research portfolio weight matrix, $w^r$

|  | Investment F | Investment G | Investment H |
| --- | --- | --- | --- |
| Day fourteen first portfolio weight | 0.3̇ | 0.3̇ | 0.3̇ |
| Day fifteen first portfolio weight | 0.3̇ | 0.3̇ | 0.3̇ |

Figure 5:
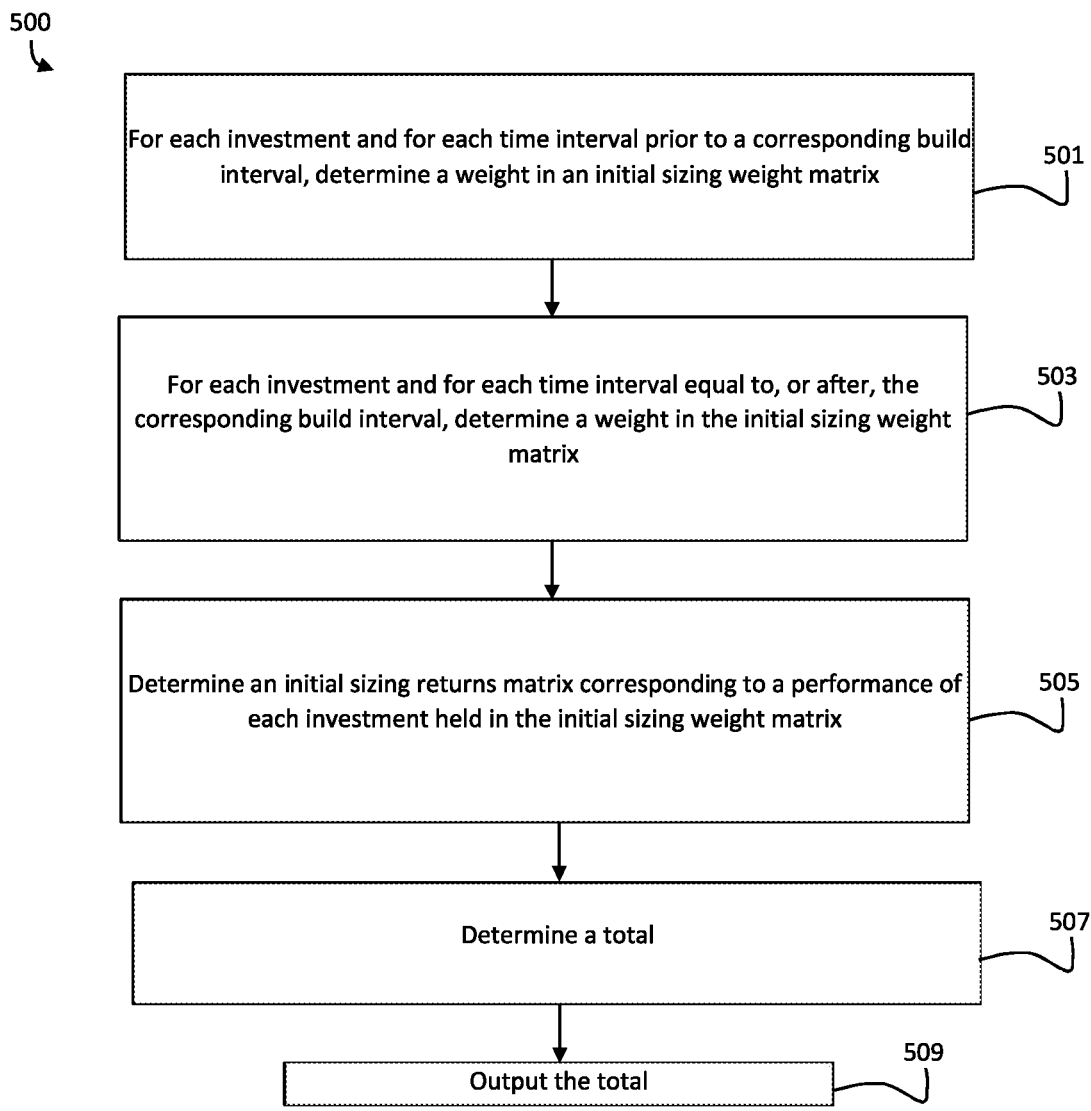
FIG. 5 depicts an example of a computer-implemented method for determining an initial sizing return matrix corresponding to a performance of an initial size of each investment held in the first portfolio.

FIG. 5 depicts an example of a computer-implemented method for determining an initial sizing return matrix, $R^{is}$, corresponding to a performance of an initial size of each investment held in the first portfolio. The initial sizing return matrix corresponds to the performance of the first portfolio if the weights corresponding to each investment were fixed after the build interval. In other words, the initial sizing return matrix, $R^{is}$, captures the relative returns associated with the initial sizing (in the research portfolio) of each investment. Table 15 shows an example of relative returns (calculated as described above in reference to the example of Table 1) and Table 16 shows an example first portfolio, each table corresponding to the research portfolio of Table 14 that will be discussed in relation to FIG. 9. The examples of Tables 14 and 16 correspond to a benchmark portfolio where the investments F, G and H are each held with a fixed weight of 0.02 and a dummy investment I is held with a fixed weight of 0.94 (i.e. the weights are the same for all days).

TABLE 15

An example relative return matrix, $R^{rel}$, corresponding to example of Table 14

|  | Investment F | Investment G | Investment H |
| --- | --- | --- | --- |
| Day one relative return (%) | 1 | 2 | −1 |
| Day two relative return (%) | 1.1 | 2.1 | −0.5 |
| Day three relative return (%) | 0.9 | 2.3 | −0.8 |
| Day four relative return (%) | 1 | 2.4 | −1 |
| Day five relative return (%) | 0.9 | 2 | −0.9 |
| Day six relative return (%) | 0.8 | 2.2 | −0.7 |
| Day seven relative return (%) | 1 | 2.3 | −1.1 |
| Day eight relative return (%) | 1.1 | 2.1 | −0.8 |
| Day nine relative return (%) | 0.8 | 2 | −0.7 |
| Day ten relative return (%) | 0.9 | 1.9 | −0.9 |
| Day eleven relative return (%) | 0.9 | 2.2 | −0.8 |
| Day twelve relative return (%) | 0.8 | 2.1 | −0.7 |
| Day thirteen relative return (%) | 0.9 | 2 | −0.8 |
| Day fourteen relative return (%) | 1 | 2.1 | −0.7 |
| Day fifteen relative return (%) | 0.9 | 2.3 | −0.9 |

TABLE 16

An example first portfolio weight matrix, $w^p$, corresponding to the example of Table 14.

|  | Investment F | Investment G | Investment H |
| --- | --- | --- | --- |
| Day one first portfolio weight | 1 | 0 | 0 |
| Day two first portfolio weight | 0.9 | 0.1 | 0 |
| Day three first portfolio weight | 0.9 | 0.1 | 0 |
| Day four first portfolio weight | 0.8 | 0.2 | 0 |
| Day five first portfolio weight | 0.8 | 0.2 | 0 |
| Day six first portfolio weight | 0.8 | 0.2 | 0 |
| Day seven first portfolio weight | 0.8 | 0.2 | 0 |
| Day eight first portfolio weight | 0.8 | 0.2 | 0 |
| Day nine first portfolio weight | 0.8 | 0.2 | 0 |
| Day ten first portfolio weight | 0.75 | 0.25 | 0 |
| Day eleven first portfolio weight | 0.75 | 0.25 | 0 |

TABLE 16-continued

An example first portfolio weight matrix, $w^p$, corresponding to the example of Table 14.

|  | Investment F | Investment G | Investment H |
| --- | --- | --- | --- |
| Day twelve first portfolio weight | 0.75 | 0.25 | 0 |
| Day thirteen first portfolio weight | 0.7 | 0.3 | 0 |
| Day fourteen first portfolio weight | 0.55 | 0.4 | 0.05 |
| Day fifteen first portfolio weight | 0.45 | 0.5 | 0.05 |

Determining the initial sizing return matrix, $R^{is}$, may comprise use of an initial sizing weight matrix, $w^{is}$ i.e. the initial sizing weight matrix, $w^{is}$, relates to the difference between the weights of the first portfolio weight matrix, $w^p$ and the weights of the research portfolio weight matrix, $w^r$, up to the build interval corresponding to each investment.

At step 501, for each investment and for each time interval prior to a corresponding build interval, a weight for the initial sizing weight matrix, $w^{is}$, may be determined. For each investment and for each time interval prior to a corresponding build interval, a weight for the initial sizing weight matrix, $w^{is}$, may be determined as a corresponding weight in the first portfolio for a corresponding time interval (and corresponding investment) minus a corresponding weight in the research portfolio for a corresponding time interval (and corresponding investment). Table 17 shows an example initial sizing weight matrix, $w^{is}$, determined using the examples research portfolio weight matrix, $w^r$, of Table 14 and example first portfolio weight matrix, $w^p$, of Table 16. For example, day four is prior to the build interval for investment G and therefore the corresponding initial sizing weight is −0.3 i.e. the corresponding weight in first portfolio (0.2) minus the corresponding weight in the research portfolio (0.5).

At step 503, for each investment and for each time interval equal to, or after, the corresponding build interval, a weight for the initial sizing weight matrix, $w^{is}$, may be determined. For each investment and for each time interval equal to, or after, the corresponding build interval, a weight for the initial sizing weight matrix, $w^{is}$, may be determined as a corresponding weight in the first portfolio (for a corresponding investment) held on the build interval minus a corresponding weight in the research portfolio (for a corresponding investment) held on the build interval. In other words, after the build interval, the weight (for the corresponding investment) in the initial sizing weight matrix, $w^{is}$, is fixed. For example, referring again to Table 17, the build interval for investment G is day twelve (as investment G is first held on day two). The day twelve initial sizing weight for investment F is −0.25 i.e. the corresponding weight in the first portfolio (0.25) minus the corresponding weight in the research portfolio (0.5). As day thirteen is after the build interval for investment G, the initial sizing weight for investment G for day thirteen is also −0.25. Similarly, the build interval for investment F is day one and the corresponding initial sizing weight is 0. As can be seen in Table 17, the initial sizing weight corresponding to investment F for all days after day (i.e. day two and onwards) one is also 0.

In an example matrix implementation which may beneficially be run on a GPU, the initial sizing weight matrix, $W^{is}$, may be determined using the subtraction of the research portfolio matrix, $w^r$, from the first portfolio weight matrix, $w^p$, to produce a resultant matrix, identifying the build interval for each investment and duplicating elements corresponding to time intervals after the build interval in the resultant matrix. Duplicating elements in the result matrix may comprise matrix multiplication with a Boolean matrix.

TABLE 17

An example initial sizing weight matrix, $W^{is}$, corresponding to the example of Table 14

| | Investment F | Investment G | Investment H |
|---|---|---|---|
| Day one initial sizing weight | 0 | 0 | 0 |
| Day two initial sizing weight | 0 | −0.4 | 0 |
| Day three initial sizing weight | 0 | −0.4 | 0 |
| Day four initial sizing weight | 0 | −0.3 | 0 |
| Day five initial sizing weight | 0 | −0.3 | 0 |
| Day six initial sizing weight | 0 | −0.3 | 0 |
| Day seven initial sizing weight | 0 | −0.3 | 0 |
| Day eight initial sizing weight | 0 | −0.3 | 0 |
| Day nine initial sizing weight | 0 | −0.3 | 0 |
| Day ten initial sizing weight | 0 | −0.25 | 0 |
| Day eleven initial sizing weight | 0 | −0.25 | 0 |
| Day twelve initial sizing weight | 0 | −0.25 | 0 |
| Day thirteen initial sizing weight | 0 | −0.25 | 0 |
| Day fourteen initial sizing weight | 0 | −0.25 | −0.28$\dot{3}$ |
| Day fifteen initial sizing weight | 0 | −0.25 | −0.28$\dot{3}$ |

At step 505, an initial sizing return matrix, $R^{is}$, is determined. The initial sizing return matrix, $R^{is}$, corresponds to the performance of each investment held in the initial sizing weight matrix, $W^{is}$, for each time interval of the first period of time. Determining 505 the initial sizing return matrix, $R^{is}$, may comprise, for each investment and each time interval, multiplying the relative return of the investment for the time interval by the corresponding weight of the investment in the initial sizing weight matrix, $W^{is}$. Table 18 shows an example initial sizing return matrix, $R^{is}$. Taking day fourteen and investment G as an example, the corresponding weight (−0.25, from Table 17) is multiplied by the corresponding relative return (2.1, from Table 15) to give the corresponding initial sizing return of −0.53.

TABLE 18

An example initial sizing return matrix, $R^{is}$, corresponding to the example of Table 14

| | Investment F | Investment G | Investment H |
|---|---|---|---|
| Day one initial sizing return (%) | 0.00 | 0.00 | 0.00 |
| Day two initial sizing return (%) | 0.00 | −0.84 | 0.00 |
| Day three initial sizing return (%) | 0.00 | −0.92 | 0.00 |
| Day four initial sizing return (%) | 0.00 | −0.72 | 0.00 |
| Day five initial sizing return (%) | 0.00 | −0.60 | 0.00 |
| Day six initial sizing return (%) | 0.00 | −0.66 | 0.00 |
| Day seven initial sizing return (%) | 0.00 | −0.69 | 0.00 |
| Day eight initial sizing return (%) | 0.00 | −0.63 | 0.00 |
| Day nine initial sizing return (%) | 0.00 | −0.60 | 0.00 |
| Day ten initial sizing return (%) | 0.00 | −0.48 | 0.00 |
| Day eleven initial sizing return (%) | 0.00 | −0.55 | 0.00 |
| Day twelve initial sizing return (%) | 0.00 | −0.53 | 0.00 |
| Day thirteen initial sizing return (%) | 0.00 | −0.50 | 0.00 |
| Day fourteen initial sizing return (%) | 0.00 | −0.53 | 0.20 |
| Day fifteen initial sizing return (%) | 0.00 | −0.58 | 0.26 |

In an example matrix implementation which may beneficially be run on a GPU, the initial sizing return matrix, $R^{is}$, may be determined 505 by use of a method similar to the determination 301 of the research portfolio weight matrix, $w^r$. In other words:

$$R^{is} = w^{is} \circ R^{rel}$$

At step 507, optionally, a total is determined. The total may be an initial-sizing total and may be determined 507 as a sum of the initial sizing return matrix, $R^{is}$, over each investment and over each time interval of the first period of time. The determination 507 of the initial-sizing total may be performed in a similar manner to the other determination of totals disclosed herein, for example, determination 307 of the binary total.

At step 509, the total (i.e. the initial-sizing total) is output. The initial-sizing total may indicate the performance of the initial sizing of the first portfolio (i.e. the weight of each investment in the first portfolio after a corresponding build time).

Figure 6:
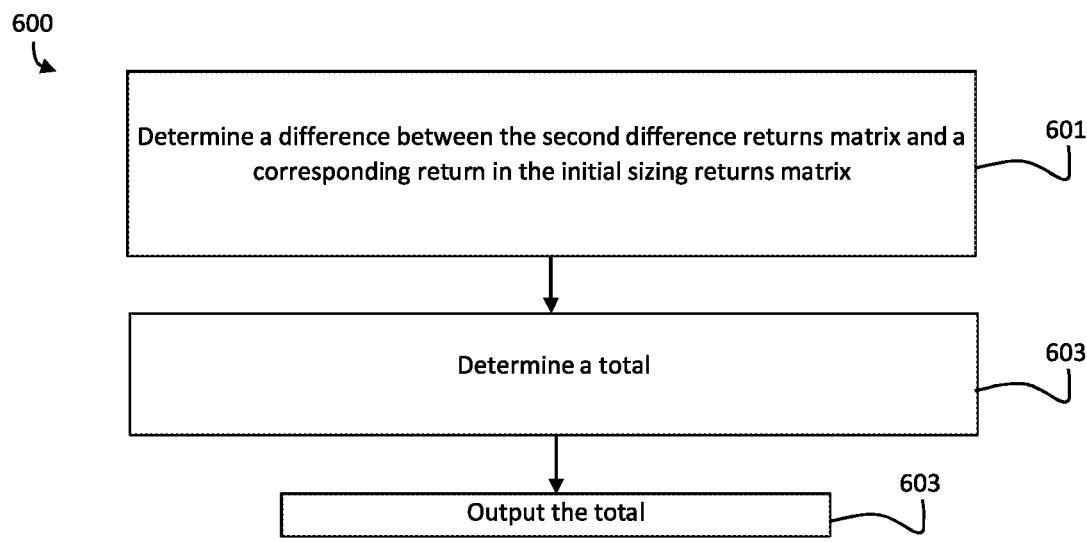
FIG. 6 depicts an example of a computer-implemented method for determining a change in sizing return matrix corresponding to a performance of each investment held in the research portfolio due to a change in the corresponding sizing after the corresponding build interval.

FIG. 6 depicts an example of a computer-implemented method for determining a change in sizing return matrix, $R^{cis}$. Each return in the change in sizing return matrix, $R^{cis}$, corresponds to a performance of each investment held in the first portfolio due to a change in the corresponding sizing after the corresponding build interval.

At step 601, a difference between the second difference return matrix, $R^{p-r}$, and the initial sizing return matrix, $R^{is}$, is determined to produce a change in sizing return matrix, $R^{cis}$. For each investment and for each time interval, a corresponding value may be determined 601 for the change in sizing return matrix, $R^{cis}$, as the difference between a corresponding return in the second difference return matrix, $R^{p-r}$, and a corresponding return in the initial sizing return matrix, $R^{is}$. Table 19 shows an example second difference return matrix, $R^{p-r}$, corresponding to the example of Table 14. Table 20 shows an example change in sizing return matrix, $R^{cis}$. Taking day fourteen and investment G as an example, the corresponding second difference return is 0.14%, the corresponding initial sizing return is −0.53% and so the corresponding change in sizing return is 0.67%, as can be seen in Table 20. Due to the way the matrices have been constructed, for time intervals prior to and including the build interval for an investment, each corresponding change in sizing return is 0%. For example, the change in sizing returns for investment G for day one to day twelve are all 0% in Table 20.

TABLE 19

An example second difference return matrix, $R^{p-r}$, corresponding to the example of Table 14.

| | Investment F | Investment G | Investment H |
|---|---|---|---|
| Day one second difference return (%) | 0 | 0 | 0 |
| Day two second difference return (%) | 0.44 | −0.84 | 0 |
| Day three second difference return (%) | 0.36 | −0.92 | 0 |
| Day four second difference return (%) | 0.3 | −0.72 | 0 |
| Day five second difference return (%) | 0.27 | −0.6 | 0 |
| Day six second difference return (%) | 0.24 | −0.66 | 0 |
| Day seven second difference return (%) | 0.3 | −0.69 | 0 |
| Day eight second difference return (%) | 0.33 | −0.63 | 0 |

TABLE 19-continued

An example second difference return matrix, $R^{p-r}$, corresponding to the example of Table 14.

|  | Investment F | Investment G | Investment H |
|---|---|---|---|
| Day nine second difference return (%) | 0.24 | −0.6 | 0 |
| Day ten second difference return (%) | 0.225 | −0.475 | 0 |
| Day eleven second difference return (%) | 0.225 | −0.55 | 0 |
| Day twelve second difference return (%) | 0.2 | −0.525 | 0 |
| Day thirteen second difference return (%) | 0.18 | −0.4 | 0 |
| Day fourteen second difference return (%) | 0.21666667 | 0.14 | 0.1983̇ |
| Day fifteen second difference return (%) | 0.105 | 0.383̇ | 0.255 |

TABLE 20

An example change in sizing return matrix, $R^{cis}$, corresponding to the example of Table 14.

|  | Investment F | Investment G | Investment H |
|---|---|---|---|
| Day one change in sizing return (%) | 0.00 | 0.00 | 0.00 |
| Day two change in sizing return (%) | 0.44 | 0.00 | 0.00 |
| Day three change in sizing return (%) | 0.36 | 0.00 | 0.00 |
| Day four change in sizing return (%) | 0.30 | 0.00 | 0.00 |
| Day five change in sizing return (%) | 0.27 | 0.00 | 0.00 |
| Day six change in sizing return (%) | 0.24 | 0.00 | 0.00 |
| Day seven change in sizing return (%) | 0.30 | 0.00 | 0.00 |
| Day eight change in sizing return (%) | 0.33 | 0.00 | 0.00 |
| Day nine change in sizing return (%) | 0.24 | 0.00 | 0.00 |
| Day ten change in sizing return (%) | 0.23 | 0.00 | 0.00 |
| Day eleven change in sizing return (%) | 0.23 | 0.00 | 0.00 |
| Day twelve change in sizing return (%) | 0.20 | 0.00 | 0.00 |
| Day thirteen change in sizing return (%) | 0.18 | 0.10 | 0.00 |
| Day fourteen change in sizing return (%) | 0.22 | 0.67 | 0.00 |
| Day fifteen change in sizing return (%) | 0.11 | 0.96 | 0.00 |

At step 603, optionally, a total may be determined. The total may be a change-in-sizing total and may be determined 603 as a sum across the change in sizing return matrix over each investment and over each time interval of the first period of time. The determination 603 of the change-in-sizing total may be performed in a similar manner to the other determination of totals disclosed herein, for example, determination 307 of the binary total.

At step 1105, optional, the total (i.e. the change-in-sizing total) is output. The change-in-sizing total may indicate the performance of the portfolio due to changes in sizing with respect to the initial sizing.

When constructed as described herein, the change-in-sizing total and the initial-sizing total may sum to the sizing total, allowing analysis of all of the alpha attributed to the sizing characteristic.

While the totals that have been determined (and provided as outputs) relate to the characteristics and sub-characteristics that have been discussed, as will be clear to the skilled person, the methods disclosed herein (i.e. the methods 100-1100) may be adapted to determine other totals that may relate to other characteristics, other sub-characteristics or sub-sub-characteristics that contribute to a sub-characteristic. For example, the binary total has been deconstructed into the selected-binary total and the not-selected-binary total. The selected-binary total may be deconstructed further to provide more detailed analysis.

While the returns matrices (for example, the first difference return matrix, $R^{r-b}$) have been constructed by calculating a first and a second returns matrix (for example, the research return matrix, $R^r$, and the benchmark return matrix, $R^b$), as will be clear to the skilled person the matrices may be constructed using similar operations in a different order. For example, a weight matrix (i.e. a first difference weight matrix, $w^{r-b}$) could be determined by subtracting the benchmark portfolio weight matrix, $w^b$, from the research portfolio weight matrix, $w^r$, and the Hadamard product between the first difference weight matrix, $w^{r-b}$, and the relative return matrix, $R^{rel}$, could be used to determine the first difference return matrix, $R^{r-b}$. Therefore, for each return matrix described herein, there may be a corresponding weight matrix, for example, the first difference return matrix, $R^{r-b}$, corresponds to the first difference weight matrix, $w^{r-b}$.

Figure 7:
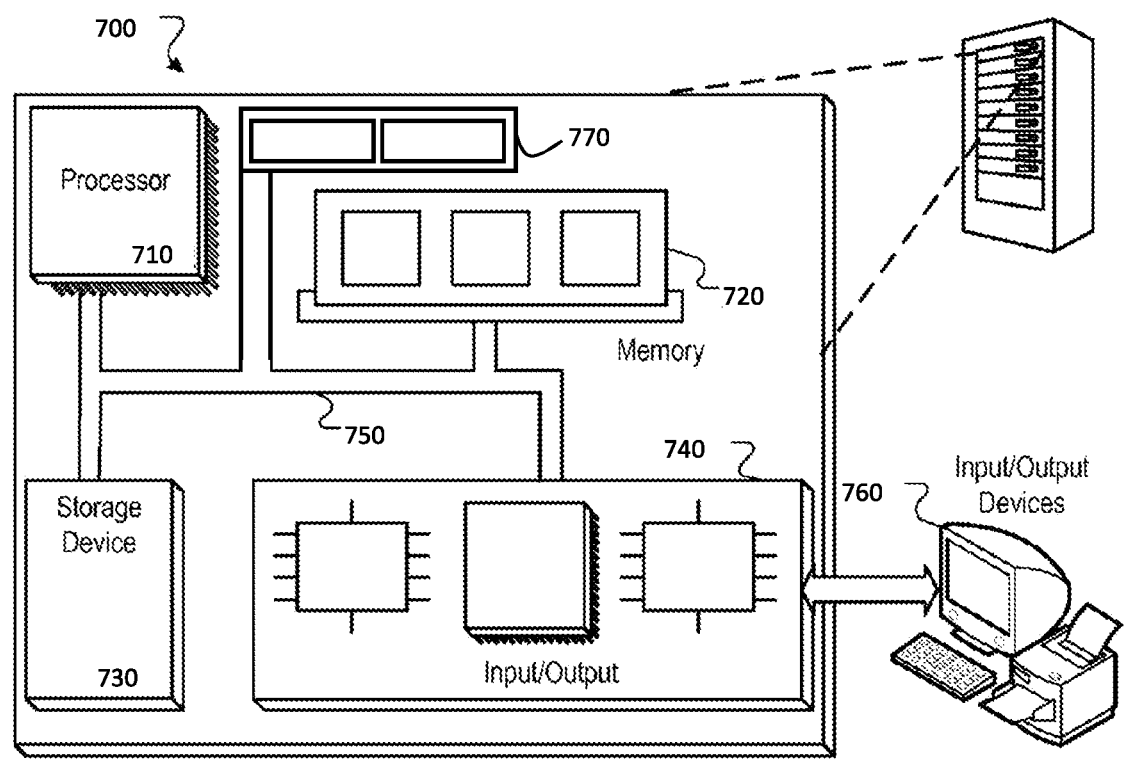
FIG. 7 depicts an example computer system that may be used to perform the methods described herein.

FIG. 7 shows an example computer system 700. The computer-implemented method 100 may be implemented on a computer system, such as the computer system 700. The computer system 700 may comprise a central processing unit 710, memory 720, one or more storage devices 730, one or more GPUs 770, an input/output processor 740, circuitry to connect the components 750 and one or more input/output devices 760.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a track-ball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed:

1. A computer-implemented method, comprising:
   receiving, at a first computing device, a first input comprising one or more first states of the first set of states across a first period of time;
   receiving, at the first computing device, a second input comprising second states of a reference set of states across the first period of time;
   generating, by the first computing device, a simulated set of states comprising one or more simulated states, the generating comprising:
      calculating, at the first computing device, and using the first input and the second input, one or more weights each corresponding to a respective state in the simulated set of states, such that the states in the simulated set of states are weighted according to a neutral position with respect to the reference set of states wherein the one or more weights are calculated using matrix calculation in a parallel manner with a graphical processing unit of the first computing device; and
   outputting the simulated set of states.

2. The method of claim 1, further comprising calculating one or more weights for a simulated set of states corresponding to a neutral position comprise:
   identifying a set of selected states from the first set of states;
   calculating a first factor, wherein the first factor is calculated as:

$$f_1 = \frac{1 - \sum_{i=1}^{n_s} w_i^b}{n_s}$$

where $n_s$ is a number of states in the set of selected states and $w_i^b$ is a corresponding weight in the reference set of states of each state in the set of selected state;

calculating a second factor, $f_2$, wherein the second factor is calculated as:

$$f_2 = 1 - \sum_{i=1}^{n_{ns}} w_i^p$$

where $n_{ns}$ is a number of states in the first set of states that are not in the set of selected states and $w_i^p$ is a weight of each state in the first set of states that is not in the set of selected states;
   determining, for each selected state, a corresponding weight of the state in the simulated set of states, $w_i^{r,s}$, as:

$$w_j^{r,s} = (f_1 + w_j^b) \times f_2$$

where $w_j^b$ is a corresponding weight of the state in the reference set of states;
   determining, for each state in the first set of states not in the set of selected states, a corresponding weight of the state in the simulated set of states, $w_k^{r,ns}$, as:

$$w_k^{r,ns} = w_k^p$$

where $w_k^p$ is a weight of the state in the first set of states; and
   determining, for each state not in the first set of states, a corresponding weight of the state in the simulated set of states, $w_i^{r,nh}$ as:

$$w_l^{r,nh} = 0.$$

3. The method of claim 2, wherein the first period of time comprises a plurality of time intervals.

4. The method of claim 3, further comprising receiving, as an input, first benefits corresponding to the first states and second benefits corresponding to the second states.

5. The method of claim 4, further comprising determining a relative benefit for each state in the first set of states and for each time interval of the first period of time, comprising:
   determining a total absolute benefit for the reference set of states for each time interval, comprising a sum of an absolute benefit for each state multiplied by the corresponding weight of the state in the reference set of states; and
   determining, for each state in the first set of states and for each time interval, a corresponding relative benefit as the difference between an absolute benefit of the state for the time interval and the total absolute benefit for the reference set of states corresponding to the time interval.

6. The method of claim 5, further comprising determining, based on the simulated set of states, a performance metric of the first set of states attributable to one or more particular characteristics of the first set of states over the first period of time.

7. The method of claim 6, further comprising:
   determining a simulated benefit matrix corresponding to a performance of each state in the simulated set of states for each time interval of the first period of time, comprising, for each state and for each time interval, multiplying a relative benefit of the state for the time interval by a corresponding weight of the state in the simulated set of states;
   determining a reference benefit matrix corresponding to a performance of each state in the reference set of states for each time interval of the first period of time, comprising, for each state and for each time interval, multiplying the relative benefit of the state for the time interval by a corresponding weight of the state in the reference set of states; and determining a first difference benefit matrix, the first difference benefit matrix corresponding to the difference between the simulated benefit matrix and the reference benefit matrix.

8. The method of claim 7, further comprising:
determining a first total corresponding to a sum across the first difference benefit matrix over each state over each time interval of the first period of time; and
outputting the first total.

9. The method of claim 6, further comprising:
determining a set of states benefit matrix corresponding to a performance of each state in the first set of states for each time interval of the first period of time, comprising, for each state and for each time interval, multiplying a relative benefit of the state for the time interval by a corresponding weight of the state in the first set of states;

determining a simulated benefit matrix corresponding to a performance of each state in the simulated set of states for each time interval of the first period of time, comprising, for each state and for each time interval, multiplying the relative benefit of the state for the time interval by a corresponding weight of the state in the simulated set of states; and determining a second difference benefit matrix, the second difference benefit matrix corresponding to the difference between the set of states benefit matrix and the simulated benefit matrix.

10. The method of claim 9, further comprising:
determining a second total corresponding to a sum of the second difference benefit matrix over each state and over each time interval of the first period of time; and
outputting the second total.

11. The method of claim 7, further comprising:
determining a third total corresponding to a sum of the first difference benefit matrix over each state in the simulated set of states that is identified as selected and over each time interval of the first period of time; and
outputting the third total.

12. The method of claim 7, further comprising:
determining a fourth total corresponding to a sum of the first difference benefit matrix over each state in the simulated set of states that is not identified as selected and over each time interval of the first period of time; and
outputting the fourth total.

13. The method of claim 6, further comprising, receiving, as input, a build time for defining a plurality of build intervals, and defining the plurality of build intervals further comprise:
for each state extant during the first time interval of the first period of time, determining the corresponding build interval as the first time interval of the first period of time; and
for each state not extant during the first time interval of the first period of time, determining the corresponding build interval as a time interval equivalent to the time interval a state was first extant plus the build time.

14. The method of claim 13, further comprising:
determining an initial sizing weight matrix, comprising:
determining, for each state and for each time interval prior to a corresponding build interval, a weight as a corresponding weight in the first set of states for a corresponding time interval and corresponding state minus a corresponding weight in the simulated set of states for a corresponding time interval and corresponding state;

determining, for each state and for each time interval equal to, or after, the corresponding build interval, the weight of the state as the weight as a corresponding weight in the first set of states for a corresponding state extant during the build interval minus the corresponding weight in the simulated set of states for a corresponding state extant during the build interval; and determining an initial sizing benefit matrix corresponding to a performance of each state in the initial sizing weight matrix for each time interval of the first period of time, comprising, for each state and each time interval, multiplying a relative benefit of the state for the time interval by the corresponding weight of the state in the initial sizing weight matrix.

15. The method of claim 14, further comprising:
determining a fifth total corresponding to a sum of the initial sizing benefit matrix over each state and over each time interval of the first period of time; and
outputting the fifth total.

16. The method of claim 14, further comprising:
determining a change in sizing benefit matrix corresponding to a performance of each state in the first set of states due to a change in the corresponding sizing after the corresponding build interval, comprising:
for each state and for each time interval, determining a corresponding benefit as the difference between a corresponding benefit in the second difference benefit matrix and a corresponding benefit in the initial sizing benefit matrix.

17. The method of claim 16, further comprising:
determining a sixth total corresponding to a sum of the change in sizing benefit matrix over each state and over each time interval of the first period of time; and
outputting the sixth total.

18. A computer system, the computer system comprising:
a plurality of processors:
one or more non-transitory computer readable media storing computer readable instructions that when executed cause the plurality of processors to, in parallel:
receive a first input comprising one or more first states of the first set of states across a first period of time;
receive a second input comprising second states of the reference set of states across the first period of time;
generate a simulated set of states comprising one or more simulated states, the generating comprising:
calculate using the first input and the second input, one or more weights each corresponding to a respective state in the simulated set of states, such that the states in the simulated set of states are weighted according to a neutral position with respect to the reference set of states wherein the one or more weights are calculated using matrix calculation in a parallel manner with a graphical processing unit of the computer system; and
outputting the simulated set of states.

19. Non-transitory computer-readable memory storing instructions which, when executed, causes one or more computer systems to:
receive a first input comprising one or more first states of the first set of states across a first period of time;
receive a second input comprising second states of the reference set of states across the first period of time;

generate a simulated set of states comprising one or more simulated states, the generating comprising:
calculate using the first input and the second input, one or more weights each corresponding to a respective state in the simulated set of states, such that the states in the simulated set of states are weighted according to a neutral position with respect to the reference set of states wherein the one or more weights are calculated using matrix calculation in a parallel manner with a graphical processing unit of the one or more computer systems; and
outputting the simulated set of states.

* * * * *